(12) United States Patent  (10) Patent No.: US 8,937,664 B2
Kwon et al.  (45) Date of Patent: Jan. 20, 2015

(54) METHOD OF CONTROLLING ELECTRONIC DEVICE AND PORTABLE TERMINAL THEREOF

(75) Inventors: Heewon Kwon, Seoul (KR); Keunryang Park, Seoul (KR); Daejoong Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 357 days.

(21) Appl. No.: 13/421,362

(22) Filed: Mar. 15, 2012

(65) Prior Publication Data

US 2012/0236161 A1  Sep. 20, 2012

Related U.S. Application Data

(60) Provisional application No. 61/452,646, filed on Mar. 15, 2011.

(30) Foreign Application Priority Data

Oct. 12, 2011  (KR) .................. 10-2011-0104331
Oct. 12, 2011  (KR) .................. 10-2011-0104333

(51) Int. Cl.
| | | |
|---|---|---|
| H04N 9/04 | (2006.01) | |
| H04N 5/225 | (2006.01) | |
| H04N 21/41 | (2011.01) | |
| H04N 21/234 | (2011.01) | |
| H04N 21/422 | (2011.01) | |
| H04N 21/4223 | (2011.01) | |
| H04N 21/436 | (2011.01) | |
| H04N 21/44 | (2011.01) | |
| H04N 21/485 | (2011.01) | |
| H04N 21/658 | (2011.01) | |

(52) U.S. Cl.
CPC ..... *H04N 21/4126* (2013.01); *H04N 21/23418* (2013.01); *H04N 21/42207* (2013.01); *H04N 21/42222* (2013.01); *H04N 21/4223* (2013.01); *H04N 21/436* (2013.01); *H04N 21/44008* (2013.01); *H04N 21/485* (2013.01); *H04N 21/6582* (2013.01)
USPC ...................................... 348/207.99

(58) Field of Classification Search
USPC ............ 348/207.1, 211.99, 143, 161, 207.99
See application file for complete search history.

(56) References Cited

U.S. PATENT DOCUMENTS

| 8,115,819 B2* | 2/2012 | Anderson ................. 348/211.1 |
| 8,446,364 B2* | 5/2013 | Solomon ..................... 345/156 |
| 2010/0039378 A1 | 2/2010 | Yabe et al. |

(Continued)

FOREIGN PATENT DOCUMENTS

| CN | 101622871 A | 1/2010 |
| CN | 101651804 A | 2/2010 |

(Continued)

*Primary Examiner* — Nicholas Giles
(74) *Attorney, Agent, or Firm* — Birch, Stewart, Kolasch & Birch, LLP

(57) ABSTRACT

Provided is a method of controlling a connection between electronic devices by using a portable terminal. The method includes: obtaining an image of a first electronic device captured by using a camera built in the portable terminal; identifying the first electronic device on the basis of the image captured by the camera; and transmitting at least one of the captured image of the first electronic device and identification information on the first electronic device to a second electronic device that is to be connected to the first electronic device.

19 Claims, 20 Drawing Sheets

(56) References Cited

U.S. PATENT DOCUMENTS

| | | |
|---|---|---|
| 2010/0103242 A1 | 4/2010 | Linaker |
| 2010/0110212 A1* | 5/2010 | Kuwahara et al. ......... 348/222.1 |
| 2010/0257473 A1 | 10/2010 | Kang |
| 2010/0304787 A1* | 12/2010 | Lee et al. ................... 455/556.1 |
| 2011/0072263 A1* | 3/2011 | Bishop et al. ................ 713/168 |

FOREIGN PATENT DOCUMENTS

| | | |
|---|---|---|
| JP | 2007-235613 A | 9/2007 |
| KR | 10-2009-0063459 A | 6/2009 |
| KR | 10-2010-0025247 A | 3/2010 |
| KR | 10-2010-0109688 A | 10/2010 |
| KR | 10-2010-0128490 A | 12/2010 |

* cited by examiner

METHOD OF CONTROLLING ELECTRONIC DEVICE AND PORTABLE TERMINAL THEREOF

CROSS-REFERENCE TO RELATED APPLICATIONS

The present application claims priority under 35 U.S.C. 119 and 35 U.S.C. 365 to Korean Patent Application Nos. 10-2011-0104331 (filed on Oct. 12, 2011) and 10-2011-0104333 (filed on Oct. 12, 2011), and U.S. Provisional Application No. 61/452646 (filed on Mar. 15, 2011), which are hereby incorporated by reference in its entirety.

BACKGROUND

The present disclosure relates to a method of controlling an electronic device by using a portable terminal.

A portable terminal is a portable device having at least one of a function for making a voice and video call, a function for inputting/outputting information, and a function for storing data.

Due to a demand for such a portable terminal having a variety of functions such as capturing pictures or videos, playing music or video files, playing games, receiving broadcastings, and accessing a wireless internet, the portable terminal is implemented in a form of a multimedia player.

SUMMARY

Embodiments provide a method of controlling an electric device by using a portable terminal that efficiently controls operations of various electronic devices, and a portable terminal thereof.

In one embodiment, a method of controlling a connection between electronic devices by using a portable terminal includes: obtaining an image of a first electronic device captured by using a camera built in the portable terminal; identifying the first electronic device on the basis of the image captured by the camera; and transmitting at least one of the captured image of the first electronic device and identification information on the first electronic device to a second electronic device that is to be connected to the first electronic device.

In another embodiment, a portable terminal for controlling a connection between electronic devices includes: a camera for obtaining a captured image of a first electronic device; a control unit for identifying the first electronic device on the basis of the obtained image and generating a connection request message including identification information on the first electronic device; and a transmission unit for transmitting at least one of the captured image of the first electronic device and the generated connection request message to a second electronic device that is to be connected to the first electronic device.

The details of one or more embodiments are set forth in the accompanying drawings and the description below. Other features will be apparent from the description and drawings, and from the claims.

DETAILED DESCRIPTION OF THE EMBODIMENTS

Hereinafter, a method of controlling an electric device and a portable terminal thereof will be described in more detail with reference to the accompanying drawings.

Hereinafter, although embodiments will be described in more detail with reference to the accompanying drawings and contents thereof, the present invention is not limited to the embodiments.

Figure 1:
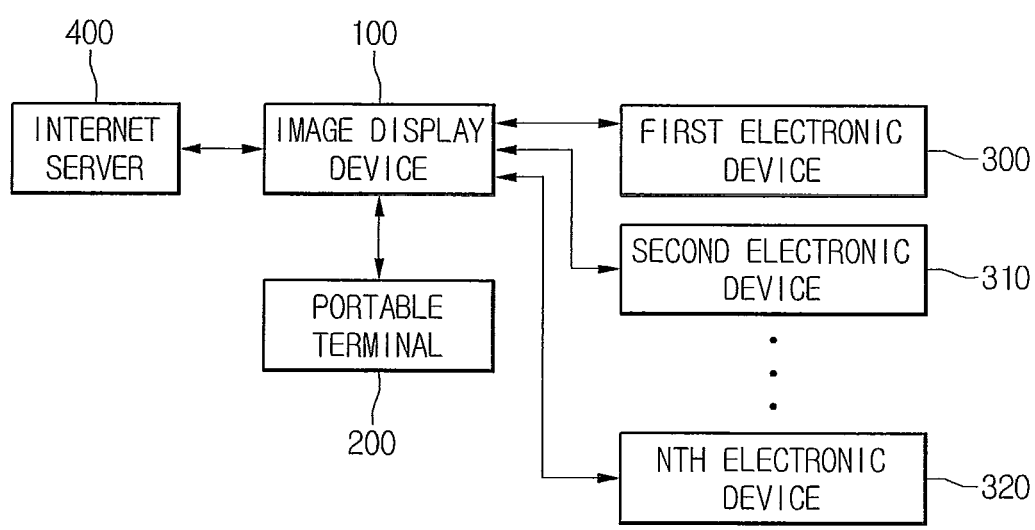
FIG. 1 is a block diagram illustrating a configuration of a display system according to an embodiment.

The terms used in this specification are selected from currently widely used general terms in consideration of functions of the present invention, but may vary according to the intentions or practices of those skilled in the art or the advent of new technology. Additionally, in certain cases, there may be terms that an applicant may arbitrarily select, and in this case, their meanings are described below. Accordingly, the terms used in this specification should be interpreted on the basis of substantial implications that the terms have and the contents across this specification not the simple names of terms FIG. 1 is a block diagram illustrating a configuration of a display system according to an embodiment. The display system may include an image display device 100, a portable terminal 200, and a plurality of electronic devices 300 to 320.

Referring to FIG. 1, the image display device 100 as an intelligent image display device having a computer supporting function in addition to a broadcasting receiving function further includes an internet function besides a solid broadcasting receiving function so that it may have an easy to use interface such as a handwriting input device, a touch screen, or a space remote controller. Moreover, after accessing internet and a computer with a wire or wireless internet supporting function, a function for e-mail, web browsing, banking, or game may be available. For such various functions, a standardized general OS may be used.

Accordingly, the image display device 100 according to an embodiment, may perform user-friendly various functions because a variety of applications may be freely added or deleted on a general OS kernel. The image display device may be a network TV, HBBTV, and a smart TV, for a specific example, and may be applied to a smart phone, if necessary.

Moreover, the portable terminal 200 may be a remote control device for controlling operations of the image display device 100, but the present invention is not limited thereto. That is, the portable terminal 200 may include a mobile communication terminal such as a smart phone or portable various devices such as a tablet PC.

For example, the portable terminal 200 may perform a function for controlling operations of the various electronic devices 300 to 320 located around the image display device 100 and operations of the image display device 100.

Additionally, the image display device 100 may access an internet server 400 via a wire/wireless network such as internet to receive a variety of contents such as movie, music, game, and applications from a Contents Provider (CP).

According to an embodiment, the image display device 100 and the external electronic device 300 are connected to each other via a wire/wireless network to transmit/receive data, so that they may share or control contents.

For example, the image display device 110 and the electronic device 300 may be connected to each other through a wire communication type such as a High Definition Multimedia Interface (HDMI) cable or various wireless communication types such as Digital Living Network Alliance (DLNA), WiFi (e.g., Wireless Lan), Wireless HD (WiHD), Wireless Home Digital Interface (WHDi), Blutooth, ZigBee, binary Code Division Multiple Access (CDMA), and Digital Interactive Interface for Video & Audio (DiiVA).

Moreover, the image display device 100 and the electronic device 300 are respectively connected to a media server (not shown) via a wire/wireless network such as internet, and transmit/receive contents data through the media server to share contents.

Figure 2:
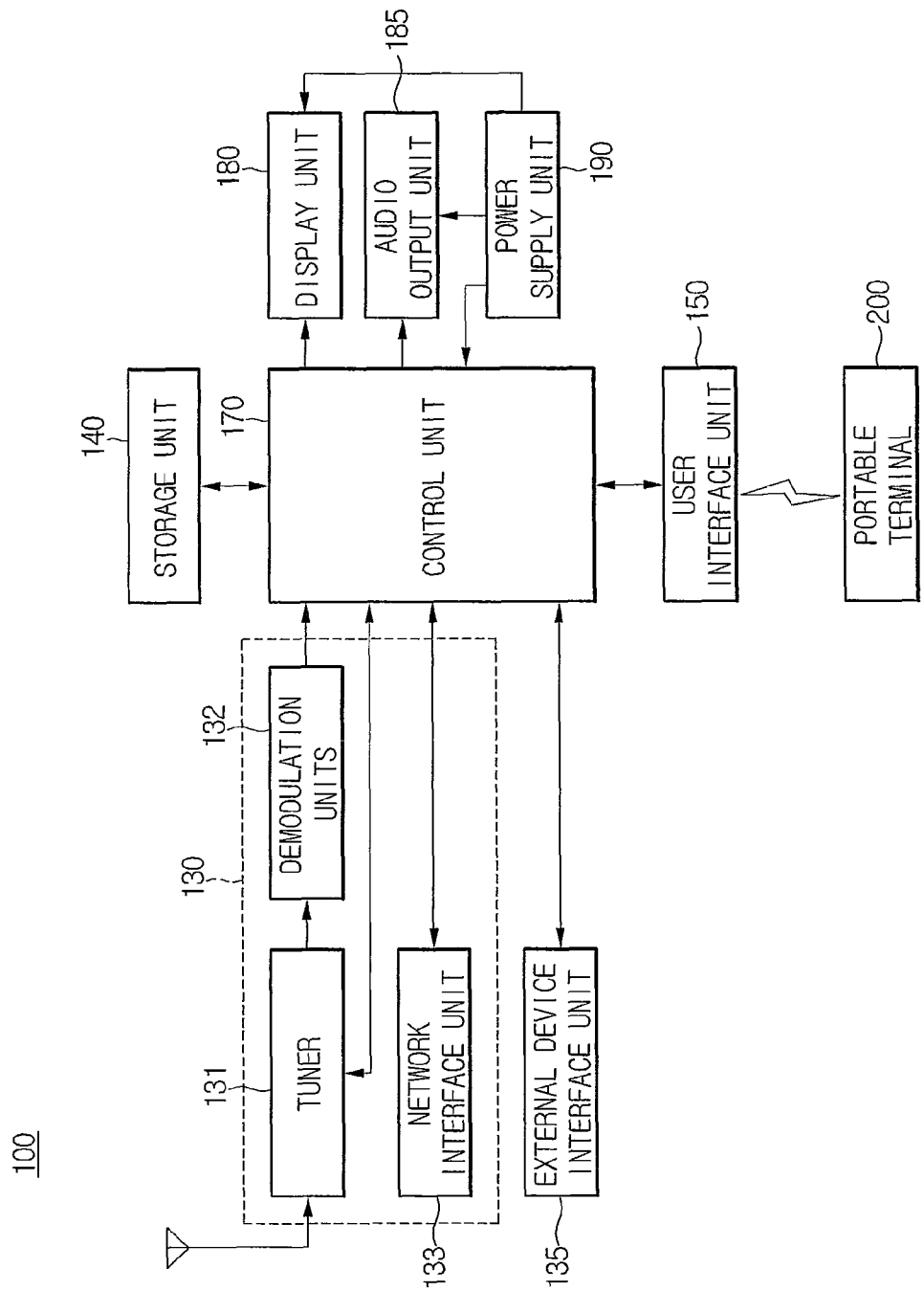
FIG. 2 is a block diagram illustrating a configuration of an image display device according to an embodiment.

FIG. 2 is a block diagram illustrating a configuration of an image display device according to an embodiment. The image display device 100 may include a broadcasting receiving unit 130, an external device interface unit 135, a storage unit 140, a user input interface unit 150, a control unit 170, a display unit 180, an audio output unit 185, and a power supply unit 190. Moreover, the broadcasting receiving unit 130 may include a tuner 131, a demodulation unit 132, and a network interface unit 133.

Referring to FIG. 2, the tuner 131 may select a channel selected by a user among Radio Frequency (RF) broadcast signals received through an antenna, or an RF broadcast signal corresponding to all pre-stored channels, and may convert the selected RF broadcast signal into an intermediate frequency signal or a baseband image or sound signal.

For example, the tuner 131 converts the selected RF broadcast signal into a digital IF signal DIF if it is a digital broadcast signal, or into an analog baseband image or sound signal CVBS/SIF if it is an analog broadcast signal.

That is, the tuner 131 may process both a digital broadcast signal and an analog broadcast signal, and the analog baseband image or sound signal CVBS/SIF outputted from the tuner 131 may be directly inputted to the control unit 170.

Moreover, the tuner 131 may receive an RF broadcast signal of a single carrier according to the Advanced Television System Committee (ATSC) format or an RF broadcast signal of a plurality of carriers according to the Digital Video Broadcasting (DVB) format.

Furthermore, the tuner 131 may sequentially select RF broadcast signals of all broadcast channels stored through a channel memory function from RF broadcast signals received through an antenna.

The demodulation unit 132 may receive the digital IF signal DIF converted by the tuner 131 and then may perform a demodulation operation. For example, if the digital IF signal outputted from the tuner 131 is the ATSC format, the demodulator 132 may perform an 8-Vestigal Side Band (8-VSB) demodulation.

Additionally, the demodulation unit 132 may perform channel decoding, and for this, may include a Trellis Decoder, a De-interleaver, and a Reed Solomon Decoder to perform Trellis decoding, de-interleaving, and Reed Solomon decoding.

For example, if the digital IF signal outputted from the tuner 131 is the DVB format, the demodulator 132 may a Coded Orthogonal Frequency Division Modulation (COFDMA) modulation.

Additionally, the demodulation unit 132 may perform channel decoding, and for this, may include a convolution decoder, a De-interleaver, and a Reed Solomon Decoder to perform convolutional decoding, de-interleaving, and Reed Solomon decoding.

The demodulation unit 132 may output a stream signal TS after performing demodulation and channel decoding, and the stream signal may be a signal that an image signal, sound signal, or a data signal is multiplexed.

For example, the stream signal may be an MPEG-2 Transport Stream (TS) that an MPEG-2 standard image signal and a Dolby AC-3 standard sound signal are multiplexed. In more detail, the MPEG-2 TS may include a 4 byte header and a 184 byte payload.

Furthermore, the demodulation unit 132 may include an ATSC demodulation unit and a DVB demodulation unit separately according to the ATSC format and the DVB format.

The stream signal outputted from the demodulation unit 132 may be inputted to the control unit 170, and the control unit 180 may output an image to the display unit 180 and a sound to the audio output unit 185 after demultiplexing and processing an image/sound signal.

The external device interface unit 135 may connect an external device and the image display device 100, and for this, may include an A/V input/output unit (not shown) or a wireless communication unit (not shown).

The external interface unit 135 may used for wire/wireless connection of an external device such as a Digital Versatile Disk (DVD) player, a Bluray player, a camera, a camcorder, and a computer (such as a notebook computer).

Moreover, the external device interface unit 135 may deliver an image, sound, or data signal inputted from a connected external into the control unit 170 of the image display device 100, and may output the image, sound, or data signal processed in the control unit 170 into a connected external device.

The A/V input/output unit may include a USB terminal, a Composite Video Banking Sync (CVBS) terminal, a component terminal, an S-video terminal (analog), a Digital Visual Interface (DVI) terminal, an HDMI terminal, an RGB terminal, and a D-SUB terminal, in order to input an image and sound signal of an external device into the image display device 100.

Furthermore, the wireless communication unit may perform a short-range wireless communication with another electronic device. For example, the image display device 100 and another electronic device may be connected to a network through communication standards such as Bluetooth, Radio Frequency Identification (RFID), infrared Data Association (IrDA), Ultra Wideband (UWB), ZigBee, and Digital Living Network Alliance (DLNA).

Moreover, the external device interface unit 135 is connected to various set top boxes through at least one of the various terminals in order to perform an input/output operation with a set top box.

In addition, the external device interface unit 135 may receive applications or lists of applications in an adjacent external device, and then may deliver them to the control unit 170 or the storage unit 140.

The network interface unit 133 may provide an interface for connecting the image display device 100 to a wire/wireless network including an internet network. For example, the network interface unit 133 may include an Ethernet terminal for accessing a wired network or may be connected to a wireless network through a communication standard such as Wireless LAN (WLAN) such as Wi-Fi, Wireless broadband (Wibro), World Interoperability for Microwave Access (Wimax), and High Speed Downlink Packet Access (HS-DPA).

Moreover, the network interface unit 133 may transmit/receive data to/from another user or another electronic device through a connected network or another network linked to a connected network.

Additionally, the network interface unit 133 may transmit some contents data stored in the image display device 100 to a selected user or electronic device among users or other electronic devices pre-registered in the image display device 100.

The network interface unit 133 may access a predetermined web page through a connected network or another network linked to a connected network. That is, the network interface unit 133 may access a predetermined web page via a network to transmit/receive data to/from a corresponding sever.

Then, the network interface unit 133 may receive contents or data provided by a CP or a network operator. That is, the network interface unit 133 may receive contents such as movies, advertisings, games, VODs, and broadcast signals provided from a CP or a network provider via a network and information related to them.

Additionally, the network interface unit 133 may receive update information and update files of a firmware provided by a CP or a network operator, and transmit data to an internet, a CP, or a network operator.

The network interface 133 may select and receive a wanted application from applications open to air via a network.

The storage unit 140 may store a program for processing and controlling each signal in the control unit 170, and may store the processed image, sound or data signals.

Moreover, the storage unit 140 may perform a function for temporarily storing image, sound or data signals inputted from the external device interface unit 135 or the network interface unit 133, and may store information on a predetermined broadcast channel through a channel memory function.

The storage unit 140 may store applications or lists of applications inputted from the external interface unit 135 or the network interface unit 133.

The storage unit 140 may include a storage medium having at least one type of a flash memory type, a hard disk type, a multimedia card micro type, a card type memory (for example, SD or XD memory), a RAM type, and an EEPROM type.

The image display device 100 may play contents files stored in the storage unit 140 such as movie files, still image files, music files, document files, and application files and may provide them to a user.

The user input interface unit 150 may deliver a signal that a user inputs to the control unit 170 or may deliver a signal from the control unit 170 to a user. For example, the user input interface unit 150 may receive and process a control signal such as power on/off, channel selection, and screen setting from the portable terminal 200 according to various communication methods such as an RF communication method or an IR communication method, or may transmit a control signal from the control unit 170 to the portable terminal 200.

Additionally, the user input interface unit 150 may deliver to the control unit 170 a control signal inputted from a local key (not shown) such as a power key, a channel key, a volume key, and a setting key.

For example, the user input interface unit 150 may deliver to the control unit 170 a control signal inputted from a sensing unit (not shown) that senses a gesture of a user, and may transmit a signal from the control unit 170 to a sensing unit (not shown). Moreover, the sensing unit (not shown) may include a touch sensor, a sound sensor, a position sensor, and a motion sensor.

The control unit 170 may demultiplex a stream inputted from the tuner 131, the demodulation unit 132, or the external device interface unit 135, or processes demultiplexed signals so that it may generate and output a signal for image or sound output.

The image signal image-processed in the control unit 170 is inputted to the display unit 180, and then, is displayed as an image corresponding to a corresponding image signal. The image signal image-processed in the control unit 170 is inputted to the display unit 135, and then, is displayed as an image corresponding to a corresponding image signal.

The sound signal processed in the control unit 170 may be audio-outputted to the audio output unit 185. Moreover, the sound signal processed in the control unit 170 is inputted to an external output device through the external device interface unit 135.

Although not shown in FIG. 2, the control unit 170 may include a demultiplexing unit and an image processing unit.

Besides that, the control unit 170 may control overall operations of the image display device 100. For example, the control unit 170 controls the tuner 131 to tune an RF broadcast corresponding to a channel that a user selects or a pre-stored channel.

Additionally, the control unit 170 may control the image display device 100 through a user command inputted through the user input interface unit 150 or an internal program, and may access a network to download applications that a user wants or lists of applications into the image display device 100.

For example, the control unit 170 controls the tuner 131 to receive a signal of a selected channel according to a predetermined channel selection command received through the user input interface unit 150, and may process an image, sound, or data signal of the selected channel.

The control unit 170 may output channel information that a user selects in addition to a processed image or a sound signal through the display unit 180 or the audio output unit 185.

Moreover, the control unit 170 may output an image or sound signal of an external device such as a camera or a camcorder, which is inputted through the external device interface unit 135, through the display unit 180 or the audio output unit 185 according to an external device image play command received through the user input interface unit 150.

Furthermore, the control unit 170 may control the display unit 180 to display an image, and for example, the control unit 170 may control the display unit 180 to display a broadcast image inputted through the tuner 131, an external input image inputted through the external device interface unit 135, an image inputted through a network interface, or an image stored in the storage unit 140. In this case, an image displayed on the display unit 180 may be a still image or a video, or a 2D image or a 3D image, Additionally, the control unit 170 may perform a control to play contents stored in the image display device 100, received broadcast contents, or external input contents inputted from an external, and the contents may have various formats such as a broadcast image, an external input image, an audio file, a sill image, an accessed web page, and a document file.

Figure 3:
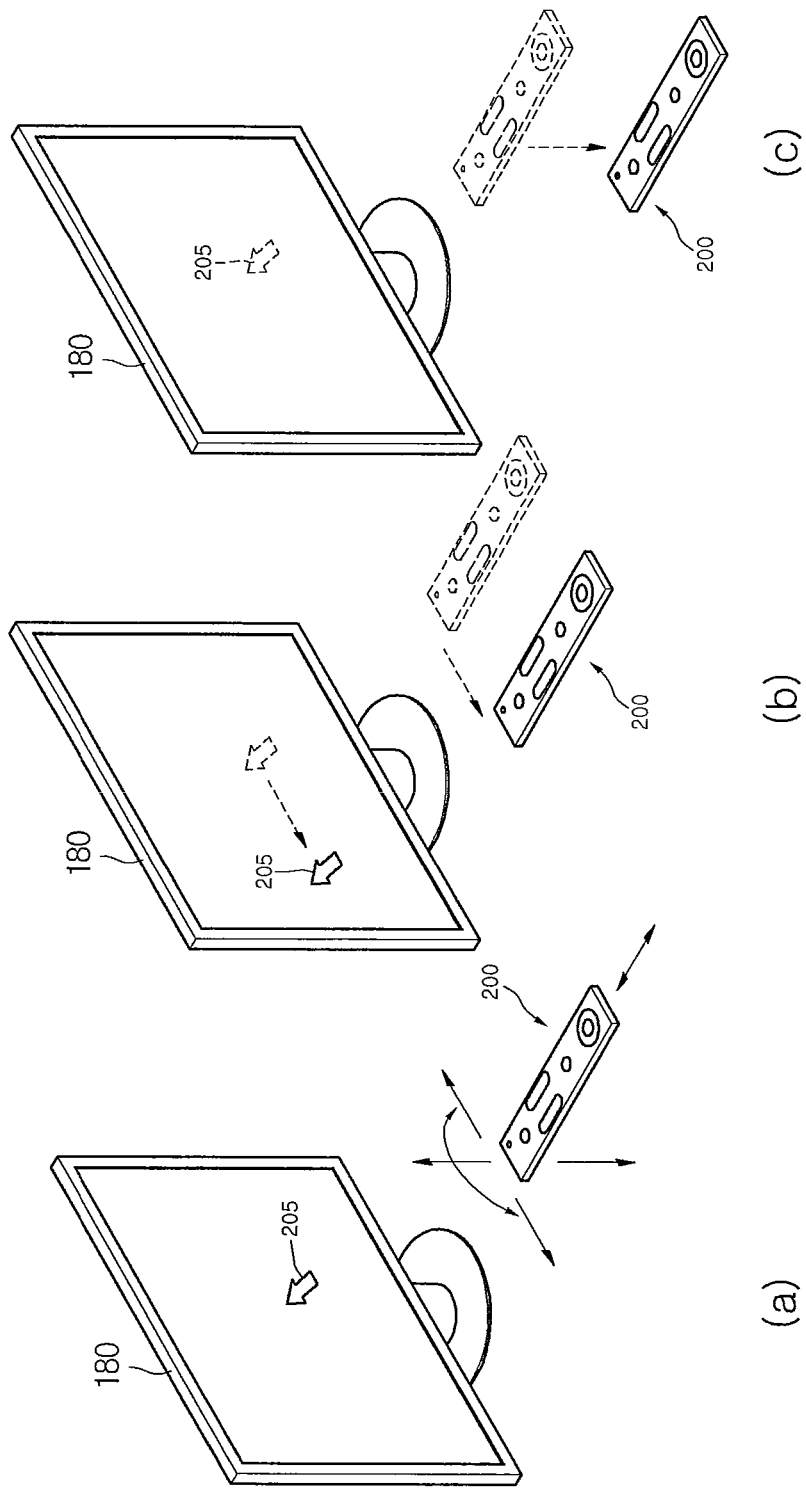
FIG. 3 is a view illustrating a method of controlling operations of an image display device by using a portable terminal according to an embodiment.

FIG. 3 is a view illustrating a method of controlling operations of an image display device by using a portable terminal. This shows the case that the portable terminal 200 performs a function of a remote control device to control operations of the image display device 100.

As shown in FIG. 3 (a), a pointer 205 corresponding to the portable terminal 200 is disposed on the display unit 180, for example.

A user may move the portable terminal 200 up and down and left and right, or may rotate it. The pointer 205 displayed on the display unit 180 of the image display device corresponds to the movement of the portable terminal 200. Since the corresponding pointer 205 moves and is displayed corresponding to the movement on 3D space of the portable terminal 200 as shown in the drawing, such a portable terminal 200 may be called a space remote controller.

FIG. 3 (b) illustrates a case that when a user moves the portable terminal 200 left, the pointer 205 displayed on the display unit 180 of the image display device moves left corresponding to the movement of the portable terminal 200.

Information on the movement of the portable terminal 200 sensed by a sensor of the portable terminal 200 is transmitted to the image display device. The image display device may calculate the coordinates of the pointer 205 from the information on the movement of the portable terminal 200. The image display device may display the pointer 205 to correspond to the calculated coordinates.

FIG. 3 (c) illustrates a case that while a specific button in the portable terminal 200 is pressed, a user moves the portable terminal 200 apart from the display unit 180. By doing so, a selected area on the display unit 180 corresponding to the pointer 205 may be zoomed in and enlarged.

On the contrary, when a user moves the portable terminal 200 closer to the display unit 180, a selected area on the display unit 180 corresponding to the pointer 205 may be zoomed out and reduced.

Additionally, when the portable terminal 200 becomes far from the display unit 180, a selected area may be zoomed out, and when the portable terminal 200 becomes closer to the display unit 180, a selected area may be zoomed in.

Moreover, while a specific button in the portable terminal 200 is pressed, up/down and left/right movements may be disregarded. That is, when the portable terminal 200 becomes closer to or far from the display unit 180, up/down and left/right movements may be disregarded and only the back and forth movements may be recognized. While a specific button in the portable terminal 200 is not pressed, the pointer 205 moves corresponding to the up/down and left/right movements of the portable terminal 200.

Moreover, the moving speed or moving direction of the pointer 205 may correspond to the moving speed or moving direction of the portable terminal 200.

Furthermore, the pointer of this specification means an object displayed on the display unit 180 in correspondence to an operation of the portable terminal 200. Accordingly, besides an arrow shape displayed as the pointer 205 in the drawing, the pointer 205 may have various shapes of objects. For example, the pointer 205 conceptually may include a dot, a cursor, and a thick outline. Moreover, the pointer 205 may be displayed corresponding to a point in the x-axis and the y-axis on the display unit 180, and also corresponding to a plurality of points such as a line and a surface.

Figure 4:
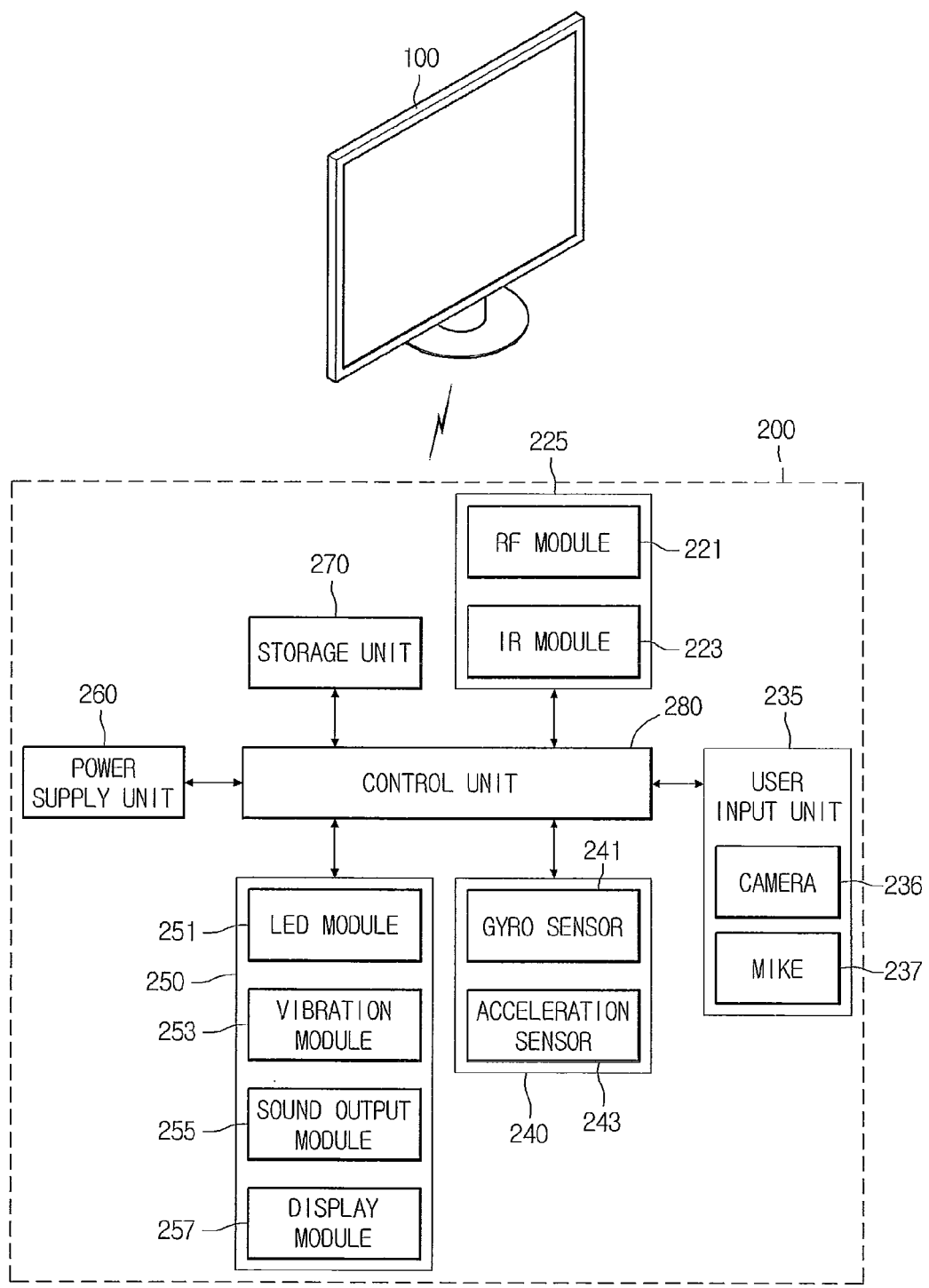
FIG. 4 is a block diagram illustrating a configuration of a portable terminal according to an embodiment.

FIG. 4 is a block diagram illustrating a configuration of a portable device according to an embodiment. The portable device 200 may include a wireless communication unit 225, a user input unit 235, a sensor unit 240, an output unit 250, a power supply unit 260, a storage unit 270, and a control unit 280.

Referring to FIG. 4, the wireless communication unit 225 transmits/receives a signal to/from an arbitrary one of the image display devices according to the above-mentioned embodiments.

The portable terminal 200 includes an RF module 221 for transmitting/receiving a signal to/from the image display device 100 according to RF communication standards, and an IR module 223 for transmitting/receiving a signal to/from the image display device 100 according to IR communication standards.

Moreover, the portable terminal 200 transmits a signal containing information on the movement of the portable terminal 200 to the image display device 100 through the RF module 221.

Moreover, the portable terminal 200 may receive a signal that the image display device 100 transmits through the RF module 221, and may transmit a command for power on/off, channel change, and volume change to the image display device 100 through the IR module 223, if necessary.

The user input unit 235 may be configured with a keypad, a button, a touch pad, or a touch screen. A user may input commands related to the image display device 100 to the portable terminal 200 by manipulating the user input unit 235. If the user input unit 235 has a hard key button, a user may input commands related to the image display device 100 to the portable terminal 200 through a push operation of the hard key button.

If the user input unit 235 has a touch screen, a user may input commands related to the image display device 100 to the portable terminal 200 by touching a soft key of the touch screen. Moreover, the user input unit 235 may include various kinds of input means that a user manipulates such as a scroll key and a jog key, and this embodiment does not limit the scope of the present invention.

According to an embodiment, the portable terminal 200 may include a camera 236 and a mike 237.

The camera 236 processes an image frame of a still image or a moving image obtained by an image sensor in a video call mode or a capturing mode, and the processed image may be displayed through the display module 257.

Moreover, the camera 236 may store the obtained image in the storage unit 270 or may transmit it to an external device such as the image display device 100 through the RF module 221. The camera 236 may be provided at least two according to a configuration shape of a terminal.

Moreover, the mike 237 recognizes and obtains an external sound, for example, a user's sound, by using a microphone in a call mode, a recording mode, a voice recognition mode, and processes the obtained external sound as sound data.

The sensor unit 240 may include a gyro sensor 241 or an acceleration sensor 243. The gyro sensor 241 may sense information on the movement of the portable terminal 200.

For example, the gyro sensor 241 may sense information on the operation of the portable terminal 200 on the bases of x, y, and z axes and the acceleration sensor 243 may sense information on the moving speed of the portable terminal 200. Furthermore, the portable terminal 200 may further include a distance measurement sensor that senses the distance between the portable terminal 200 and the display unit 180 of the image display device 100.

The output unit 250 may output an image or sound signal corresponding to the manipulation of the user input unit 235 or a signal transmitted from the image display device 100. A user may recognize the manipulation of the user input unit 235 or the control of the image display device 100 through the output unit 250.

For example, the output unit 250 may include an LED module that is turned on/off, a vibration module 253 that vibrates, a sound outputting module 255 that outputs sound, or a display module 257 that outputs an image, when the user input unit 235 is manipulated or a signal is transmitted to or received from the image display device 100 through the wireless communication unit 225.

Moreover, the power supply unit 260 supplies power to the portable terminal 200, and stops supplying power to the portable terminal 200 when the portable terminal 200 does not move for a predetermined time, so that power waste may be reduced. The power supply unit 260 may restart to supply power after a predetermined key in the portable terminal 200 is manipulated.

The storage unit 270 may store various kinds of programs and application data necessary for controls or operations of the portable terminal 200. If the portable terminal 200 wirelessly transmits and receives a signal through the image display device 100 and the RF module 221, the portable terminal and the image display device 100 may transmit/receive a signal in a predetermined frequency band.

The control unit 280 of the portable terminal 200 may store in the storage unit 270 the information on a frequency band for wirelessly transmitting/receiving a signal between the portable terminal 200 and the image display device 100 paired with the portable terminal, and may refer to the stored information.

The control unit 280 controls general matters related to a control of the portable terminal 200. The control unit 280 may transmit signal corresponding to a predetermined key manipulation of the user input unit 235 or a signal corresponding to the movement of the portable terminal 200 sensed by the sensing unit 240 to the image display device 100 through the wireless communication unit 225.

FIG. 4 is a view illustrating a configuration of the portable terminal 200 according to an embodiment. The present invention is not limited thereto, and if necessary, some of the components in FIG. 4 may be omitted or at least one component may be added therein.

For example, if the portable terminal 200 is a mobile communication terminal, the wireless communication unit 225 may further include a broadcast receiving module (not shown), a mobile communication module (not shown), a wireless internet module (not shown), a near field communication module (not shown), or a position information module (not shown).

According to an embodiment, the portable terminal may identify the electric device 300 that is to be connected to the image display device 100 by using an image obtained by the camera 236, and then may transmit the obtained image of the electronic device 200 or identified information on the electronic device 300 to the image display device 100.

Accordingly, the image display device 100 obtains information on a device connected to the image display device 100 by using the transmitted image or identification information of the electronic device 300, and performs a connection operation with the corresponding electronic device 300 by using the obtained information.

Moreover, although a case that the image display device 100 is connected to the electronic device 300 through the portable terminal 200 is described according to an embodiment, different electronic devices, for example, the first electronic device 300 and a second electronic device may be connected to each other according to the above control method.

Hereinafter, referring to FIGS. 5 to 23, a control method of connecting electronic devices by using a portable terminal will be described in more detail according to an embodiment.

FIG. 4 is a flowchart illustrating a control method of connecting electronic devices according to an embodiment. The shown control method is combined with the block diagram illustrating the configuration of the portable terminal 200 of FIG. 4 for description.

Figure 5:
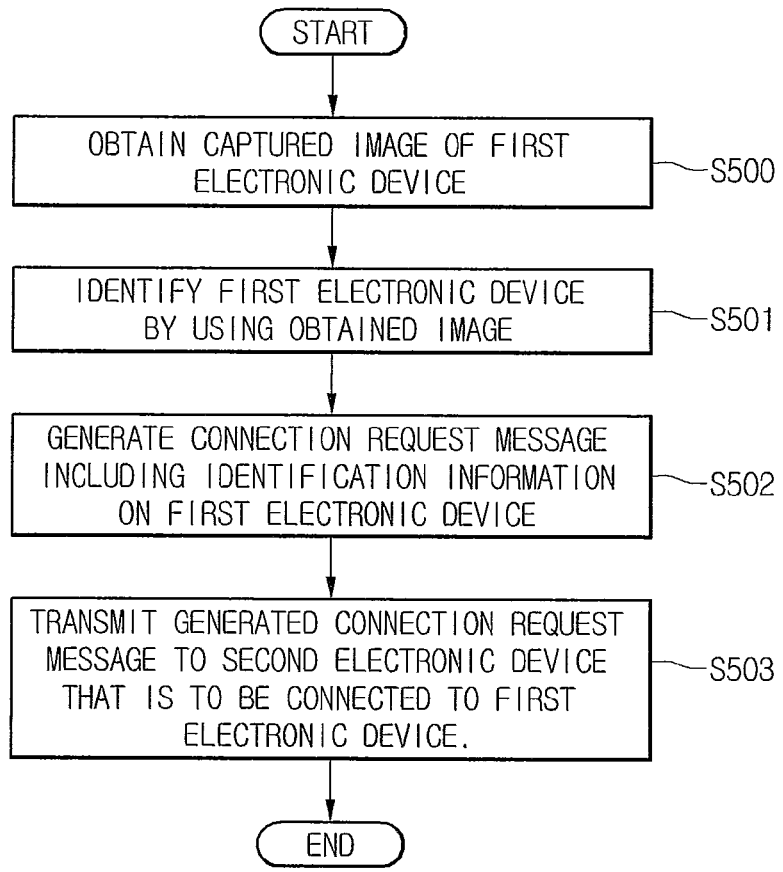
FIG. 5 is a flowchart illustrating a control method of connecting electronic devices according to an embodiment.

Referring to FIG. 5, the camera 236 of the portable terminal 200 obtains a captured image of a first electronic device in operation S500, and the control unit 280 identifies the first electronic device by using the obtained image of the first electronic device in operation S501.

A user may capture the first electronic device 300 that is to be connected to another electronic device, for example, the image display device 100, by using the camera 236 built in the portable terminal 200.

Then, the control unit 280 may identify identification information such as the product name or the model name of the first electronic device 300 by using an image outputted from the camera 236. For this, a database for searching a product having a similar appearance to the first electronic device 300 may be established in the storage unit 270, or a character recognition algorithm for recognizing the product name or the model name of the first electronic device 300 through the image may be performed by the control unit 280.

Moreover, the electronic device identifying operation in operation S501 may not be directly performed in the control unit 280 of the portable terminal 200.

For example, after the image of the first electronic device 300 obtained through the camera 236 of the portable terminal 200 may be transmitted to the internet server 400, the internet server 400 may search the database or perform a character recognition algorithm by using the transmitted image so that it may identify the product name or the model name of the first electronic device 300. Then, the internet server 400 may transmit the identification information on the first electronic device 300 to the portable terminal 200.

Moreover, transmitting/receiving the image and identification information between the portable terminal 200 and the internet server 400 may be performed through the internet-enabled image display device 100.

For example, the image of the first electronic device 300 captured in the portable terminal 200 may be transmitted to the image display device 100, and the image display device 100 may directly identify the first electronic device 300. Or, the image display device 100 may retransmit the transmitted image of the first electronic device 300 to the internet server 400 to perform an identification operation on the first electronic device 300 by the internet server 400, and then the identification information may be transmitted to the image display device 100.

Then, the control unit 280 of the portable terminal 200 generates a connection request message including the identification information on the first electronic device in operation S502, and the wireless communication unit 225 transmits the generated connection request message to the second electronic device that is to be connected to the first electronic device in operation S503.

For example, the wireless communication unit 225 of the portable terminal 200 transmits the connection request message to the second electronic device 310 in order for the second electronic device 310 to perform operations for connection to the first electronic device 300 by using the identification information (for example, the product name or the model name) of the first electronic device in the connection request message.

When the first and second electronic devices 300 and 310 are connected to each other via a wireless network, the second electronic device 310 transmits a connection request message to the first electronic device by using the received identification information of the first electronic device 300, and receives a network ID and a password from the first electronic device 300 to access the corresponding network, so that it may be connected to the first electronic device 300.

However, connection operations performed in the second electronic device 310 may vary according to a communication connection method between the first and second electronic devices 300 and 310, and may be performed using various typical communication connection methods.

However, although a method of connection the first electronic device 300 and the second electronic device 310 by using the portable terminal 200 was described with reference to FIG. 5, the present invention is not limited thereto. For example, one of the connected first and second electronic devices 300 and 310 may be the image display device 100 or other various devices.

FIGS. 6 to 11 are views illustrating a method of controlling a connection between electronic devices by using a portable terminal according to a first embodiment.

Figure 6:
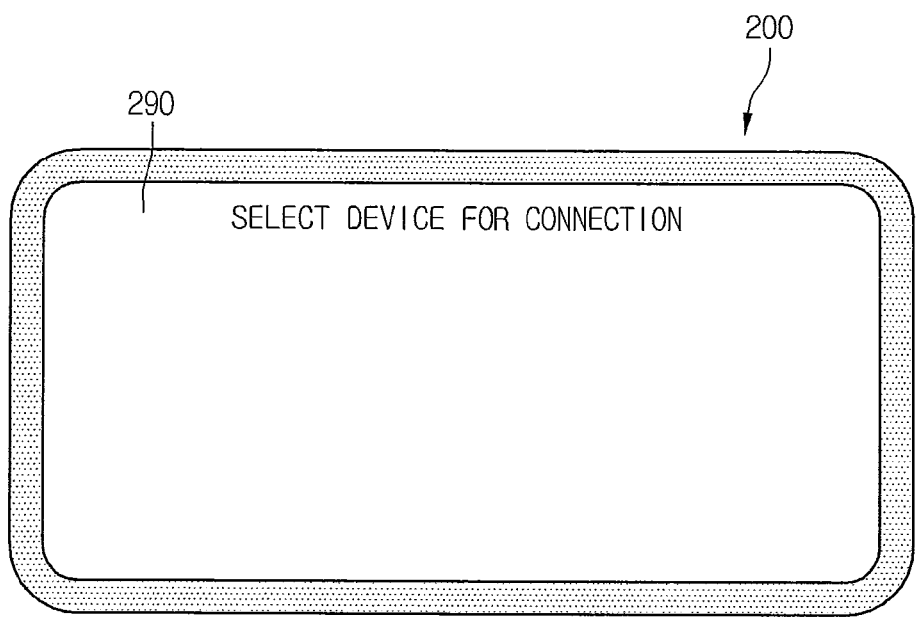
FIGS. 6 to 11 are views illustrating a control method of connecting electronic devices by using a portable terminal according to a first embodiment.

Referring to FIG. 6, when a user performs an electronic device connection control function in the portable terminal 200, a capture function is activated once power is applied to the camera 236 built in the portable terminal 200. Then, a user interface screen 290 for allowing a user to select devices that are to be connected to each other by using the image captured through the camera 236 may be provided on the portable terminal 200.

Figure 7:
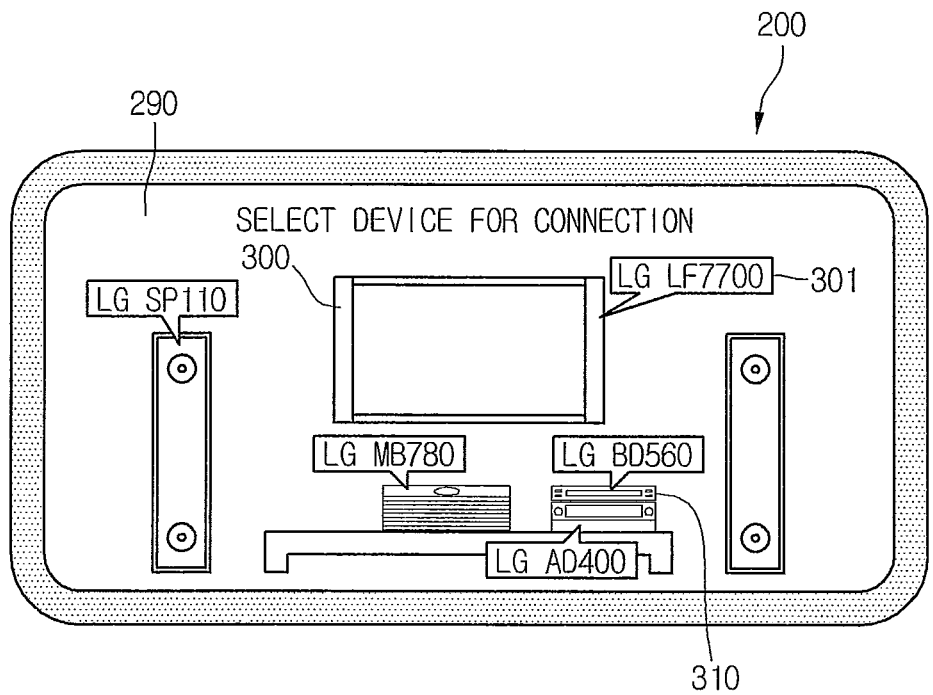

Then, as shown in FIG. 7, the user may adjust a direction and position of the camera 236 to allow a plurality of electronic devices 300 to 340, which include electronic devices that are to be connected to each other, to be positioned within the screen 290 of the portable terminal 200.

Moreover, the screen 290 may display an image on the screen, which is stored in the storage unit 170 after obtained by the camera 236 as pressing a capturing button of the portable terminal 200, or is obtained by the camera 236 before pressing the capturing button.

For example, the screen 290 may be displayed using an augmented reality technology. In this case, an image obtained in real time by the camera 236 and additional information regarding the image may be displayed on the screen 290.

Referring to FIG. 7, the image displayed on the screen 290 may include the plurality of electronic devices 300 to 340 captured in real time by the camera 236 and identification information on each of the electronic devices 300 to 340.

Moreover, the identification information may be obtained by using an image of a corresponding electronic device captured by the camera 236, and the identification information may be obtained by one of the portable terminal 200, the image display device 100, and the internet server 400 as described with reference to FIG. 5.

For example, the portable terminal 200 may recognize the model name 'LG LF7700' of the first electronic device 300 by using an image of the first electronic device 300 among images captured by the camera 236, and the recognized identification information 'LG LF7700' 301 may be displayed on the screen 290 in correspondence to the image of the first electronic device 300.

In this case, a user selects the image of the first electronic device 300 or the identification information 'LG LF7700' 301 displayed on the screen 290 in order to select the first electronic device 300 as a device that is to be connected to another device.

Then, after the above method of selecting a device is performed several times, a device that is to be connected to the selected first electronic device 300 may be selected.

Figure 8:
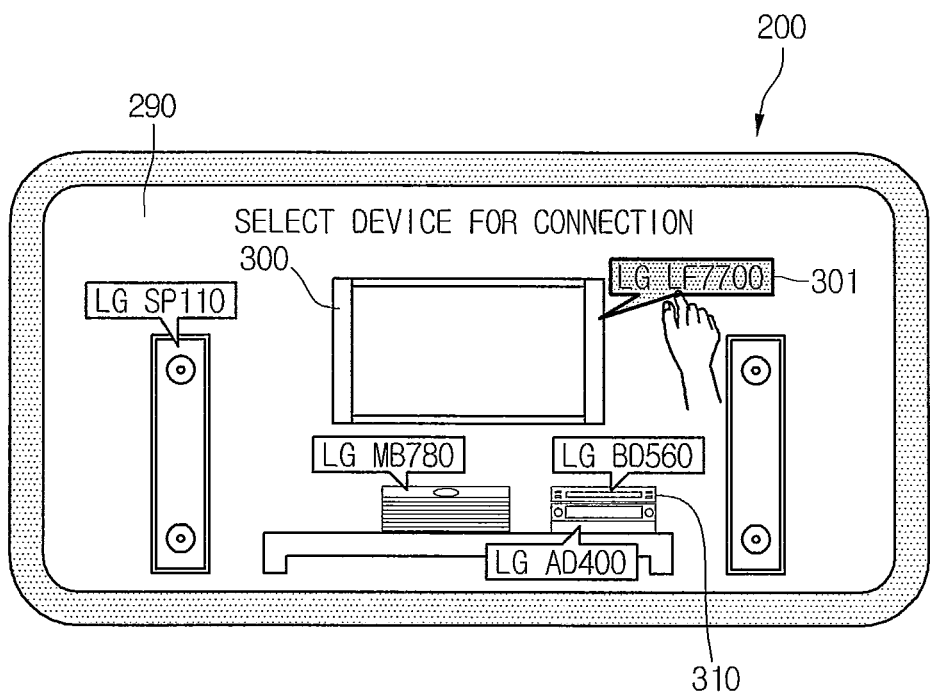
Figure 9:
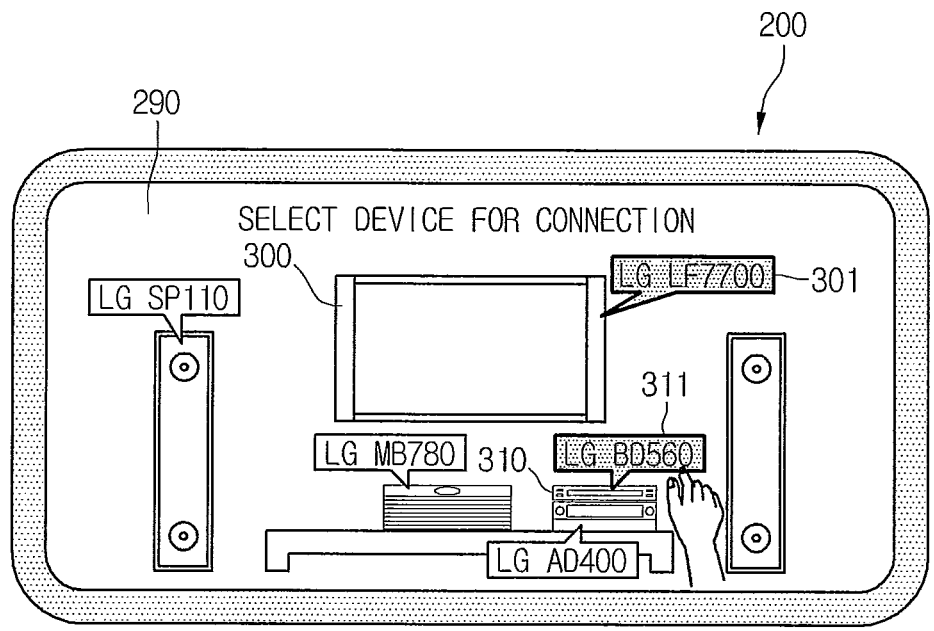

Referring to FIG. 9, a user selects the first electronic device 300 on the screen 290 of FIG. 8, and then selects the image of the second electronic device 310 or its identification information 'LG BD560' 311 to select the second electronic device 310 as a device that is to be connected to the first electronic device 300.

According to another embodiment, a user may select devices that are to be connected to each other through a drag and drop operation.

Figure 10:
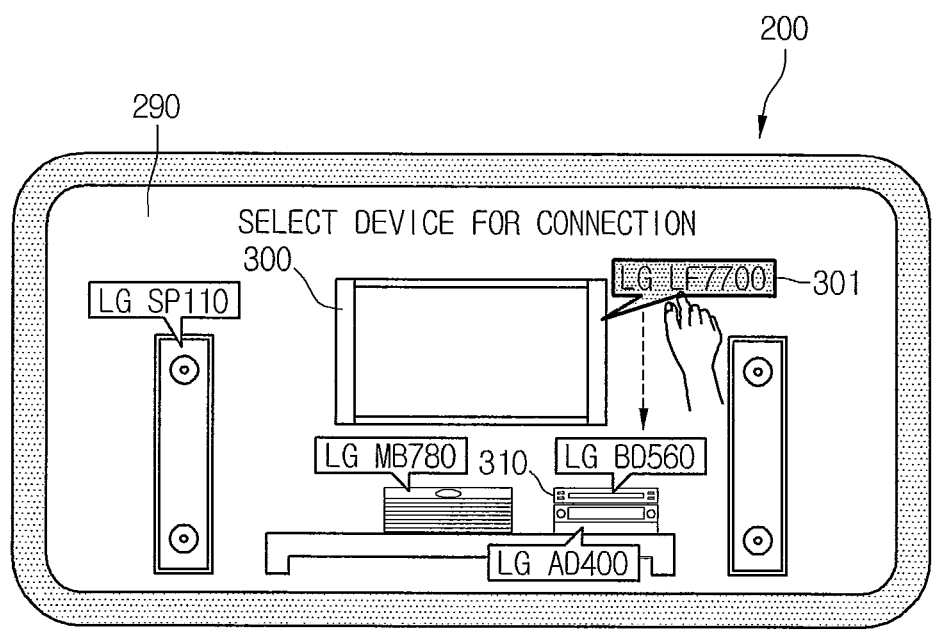

Referring to FIG. 10, if a user selects the identification information 'LG LF7700' 301 of the first electronic device 300 and moves it to a specific direction, a virtual image 3011 corresponding to the 'LG LF7700 301' is generated and moved in a direction that a user wants.

Accordingly, a user may drag the virtual image 3011 corresponding to the 'LG LF7700' 301 to move it to the direction where the identification information 'LG BD560' of the second electronic device 310 is positioned.

Figure 11:
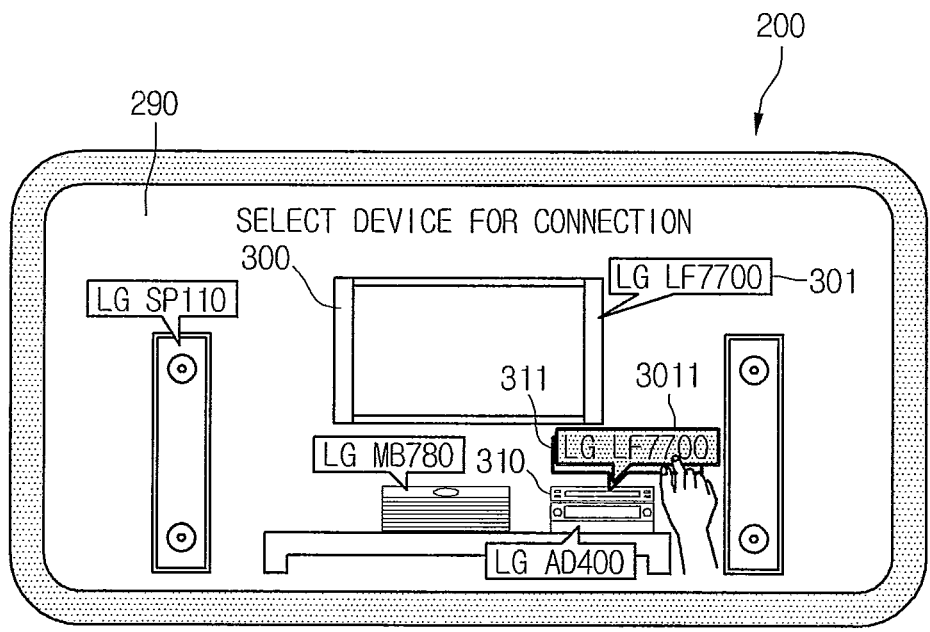

Referring to FIG. 11, if the dragged virtual image 3011 is dropped in an area where the identification information 'LG BD560' of the second electronic device 310 is positioned, connection between the first electronic device 300 and the second electronic device 310 may be requested through the portable terminal 200.

When devices that are to be connected to each other are selected through the method described with reference to FIGS. 6 to 11, the portable terminal 200 may transmit identification information on another device to at least one of the selected devices and may control a connection operation between the selected devices.

For example, the portable terminal 200 transmits the connection request message including the model name 'LG BD560' of the second electronic device 310 to the first electronic device 300, i.e., an image display device (for example, TV), and then, the first electronic device 300 may perform operations for connection to the second electronic device 310 in response to the received connection request message.

On the contrary, the portable terminal 200 transmits the connection request message including the model name 'LG LF7700' of the first electronic device 300 to the second electronic device 310, and then, the second electronic device 310 may perform operations for connection to the first electronic device 300 in response to the received connection request message.

Moreover, the portable terminal 200 transmits the connection request message including the model name 'LG BD560' of the second electronic device 310 to the first electronic device 300, and transmits the connection request message including the model name 'LG LF7700' of the first electronic device 300 to the second electronic device 310 simultaneously, so that connection operations between the first and second electronic devices 300 and 310 may be mutually complementarily performed.

According to an embodiment, information on a performed connection result between the electronic devices may be provided through the portable terminal 200.

Figure 12:
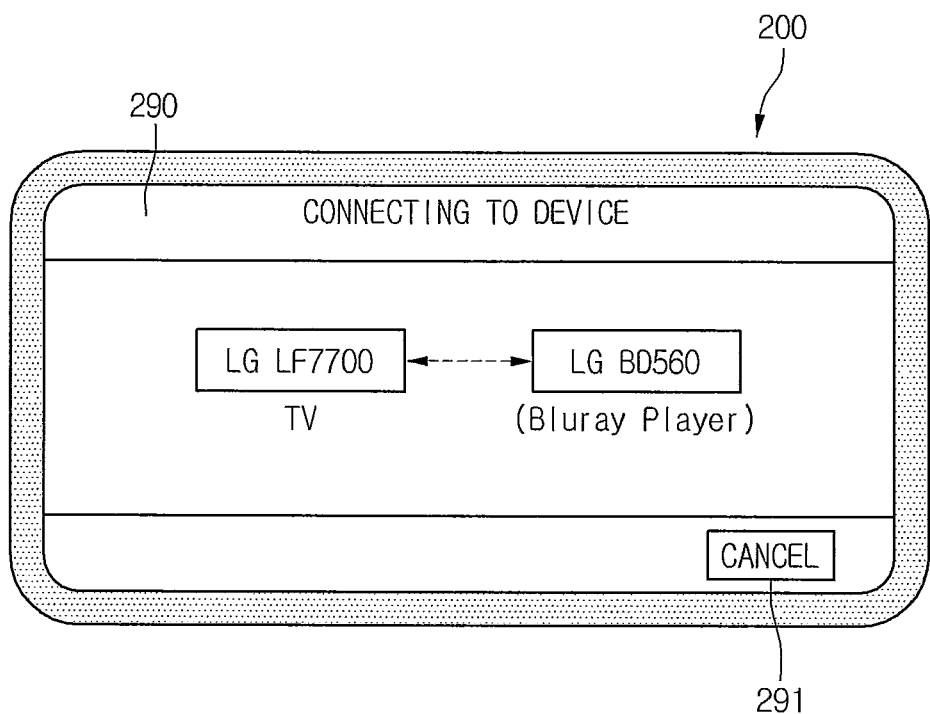
FIGS. 12 to 15 are views illustrating a method of displaying information on a connection result according to embodiments.

Referring to FIG. 12, while a device connection operation is performed, the product name 'TV' and the model name "LG LF7700' of the first electronic device 300 selected to be connected and the product name 'Bluray Player' and the model name 'LG BD560' of the second electronic device 310 are displayed on the screen 290, and a message notifying 'devices are connecting' may be displayed on the screen 290 at the same time.

Moreover, while a device connection operation is performed, a user may select a button 'cancel' to cancel the connection operation between the first and second electronic devices 300 and 310.

Figure 13:
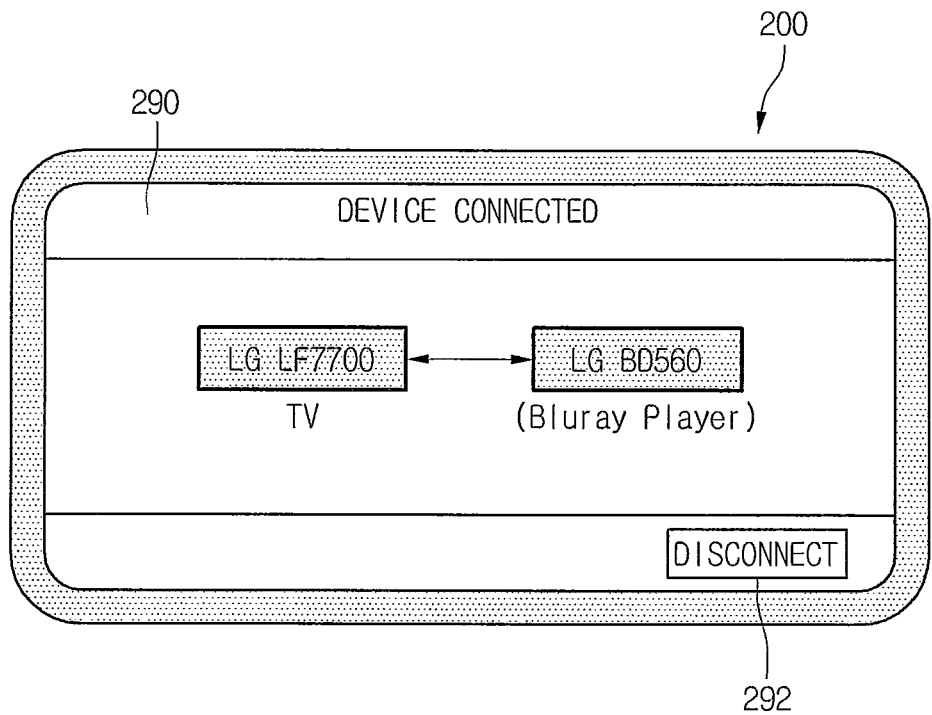

Referring to FIG. 13, when the electronic devices 300 and 310 are connected to each other after the device connection operation is successfully completed, information on the product name and model name of each of the first and second electronic devices 300 and 310 may be displayed with a different color, size, and font than a pre connection state. So that a condition that two devices are connected to each other may be displayed on the screen 290.

Moreover, when a device connection is completed, a user may select a button 'disconnect' to disconnect the connection between the first and second electronic devices 300 and 310.

If a device connection between the two electronic devices 300 and 310 is not successfully completed due to the connection failure, a reason or solution for the connection failure may be provided to a user.

Figure 14:
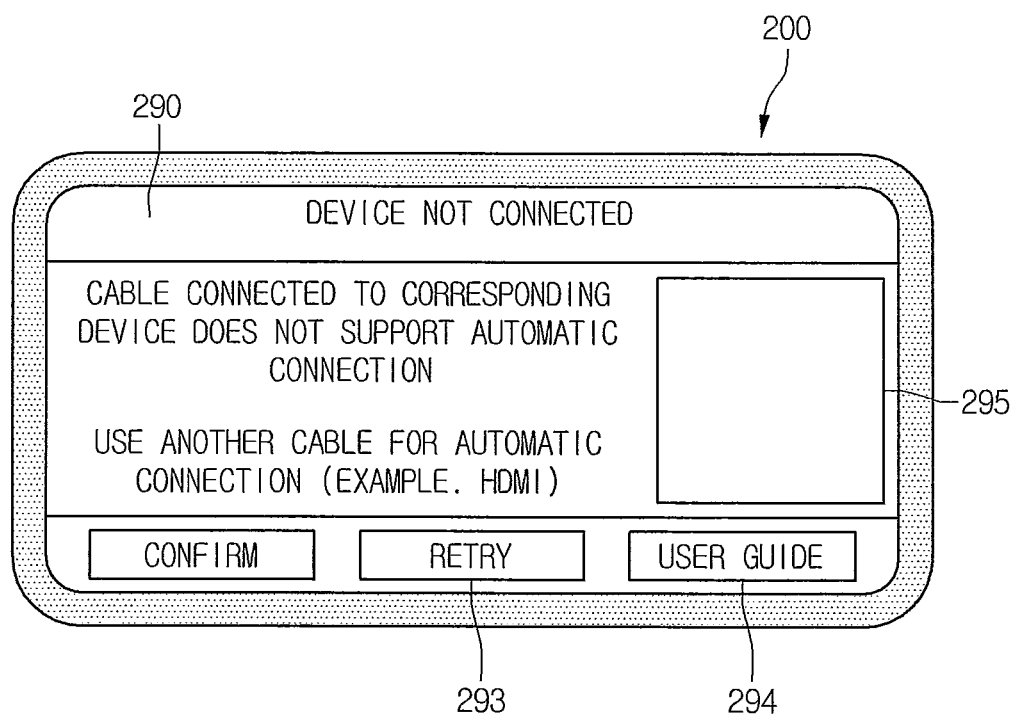

Referring to FIG. 14, if there is no cable between the first and second electronic devices 300 and 310 that are supposed to be connected using a wire connection method, a message including a corresponding connection failure reason and a message notifying that a cable such as HDMI is required for automatic connection may be displayed on the screen 290.

Moreover, a connection sample image 295 for wire cable connection between the first and second electronic devices 300 and 310 may be displayed on the screen 290, and the connection sample image 295 may show a cable form or a connection portion.

Additionally, a user may select a button 'retry' 293 in order to perform again a connection operation between the first and second electronic devices 300 and 310, and may select a button 'user guide' 294 in order to receive more detailed guide information for connecting the first and second electronic devices 300 and 310 successfully.

Figure 15:
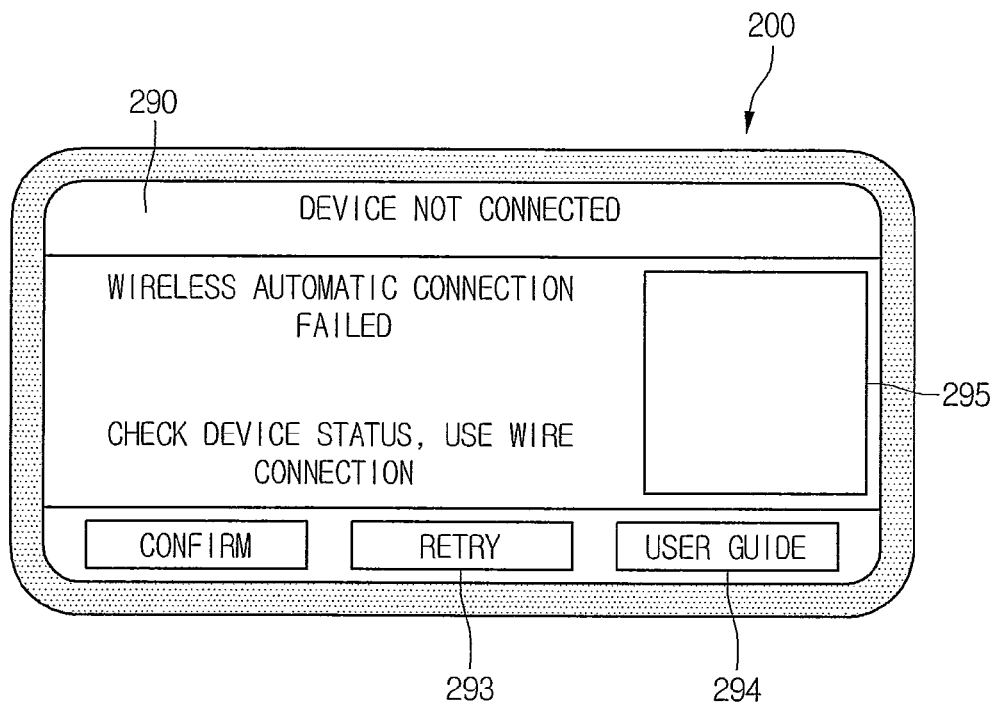

Referring to FIG. 15, if wireless connection is failed between the first and second electronic devices 300 and 310, a message for the reason for corresponding connection failure and a message for checking equipment status check or recommending wire connection may be displayed on the screen 290.

In this case, a user may select a button 'retry' 293 in order to perform again a wireless connection operation between the first and second electronic devices 300 and 310, and may select a button 'user guide' 294 in order to check a method of wirelessly connecting the first and second electronic devices 300 and 310.

According to an embodiment, the connection result information described with reference to FIGS. 12 to 15 may be transmitted from one (for example, an image display device that receives a connection request message from the portable terminal 200) of the first and second electronic devices 300 and 311 to the portable terminal 200.

Furthermore, once a connection between the electronic devices is completed through the above method, a user interface for controlling integrated operations of the connected electronic devices may be displayed on the screen 290 of the portable terminal 200.

Figure 16:
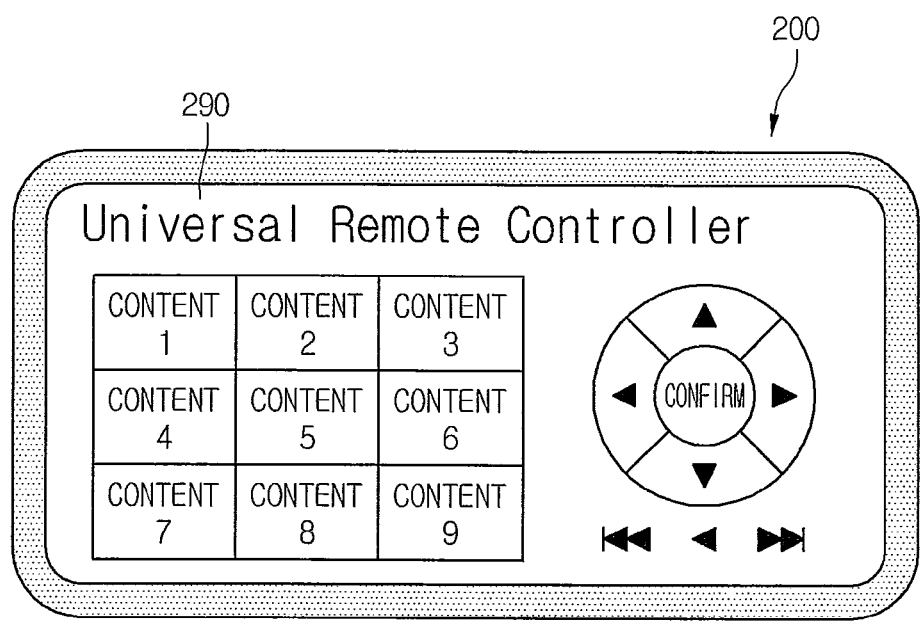
FIG. 16 is a view illustrating a configuration of a user interface for integrated control of a plurality of electronic devices according to an embodiment.

FIG. 16 is a view illustrating a configuration of a user interface for integrated control on a plurality of electronic devices according to an embodiment.

Referring to FIG. 16, if connection is completed between the first and second electronic devices 300 and 311, the user interface for controlling operations of the first electrode device 100 and the second electronic device 311 may be displayed on the screen 290.

Accordingly, a user may easily control operations of desired one of the connected first and second electronic devices 300 and 311 through the user interface of the portable terminal 200 as shown in FIG. 16.

FIGS. 17 to 22 are views illustrating a control method of connecting electronic devices by using a portable terminal according to a second embodiment. This control method related description identical to those described with reference to FIGS. 5 to 16 will be omitted below.

Figure 17:
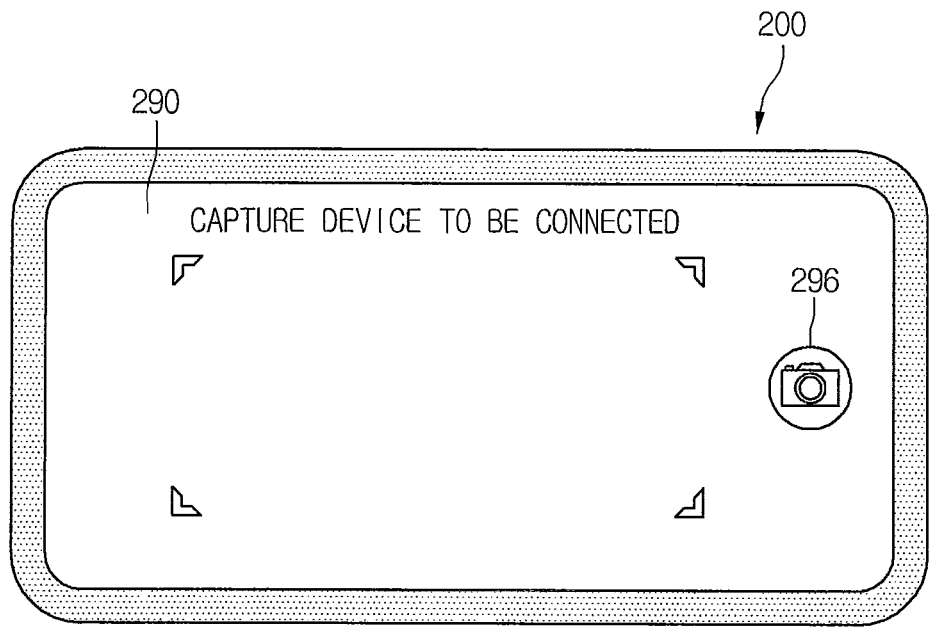
FIGS. 17 to 22 are views illustrating a method of controlling a connection between electronic devices by using a portable terminal according to a second embodiment.

Referring to FIG. 17, when a user executes a control function for connecting electronic devices in the portable terminal 200, power may be supplied to the camera 236 built in the portable terminal 200, and then, a capturing function may be activated.

Figure 18:
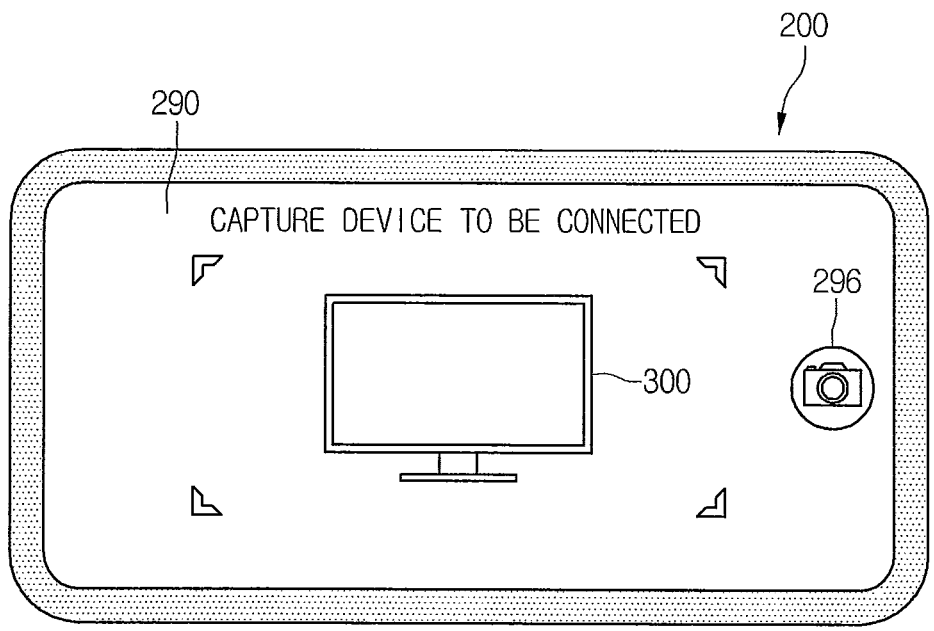

Then, as shown in FIG. 18, the user may adjust a direction and position of the camera 236 to allow the first electronic device 300, which is to be connected to another device, to be positioned within the screen 290 of the portable terminal 200, and then, may select the capturing button 296 to capture the first electronic device 300.

Figure 19:
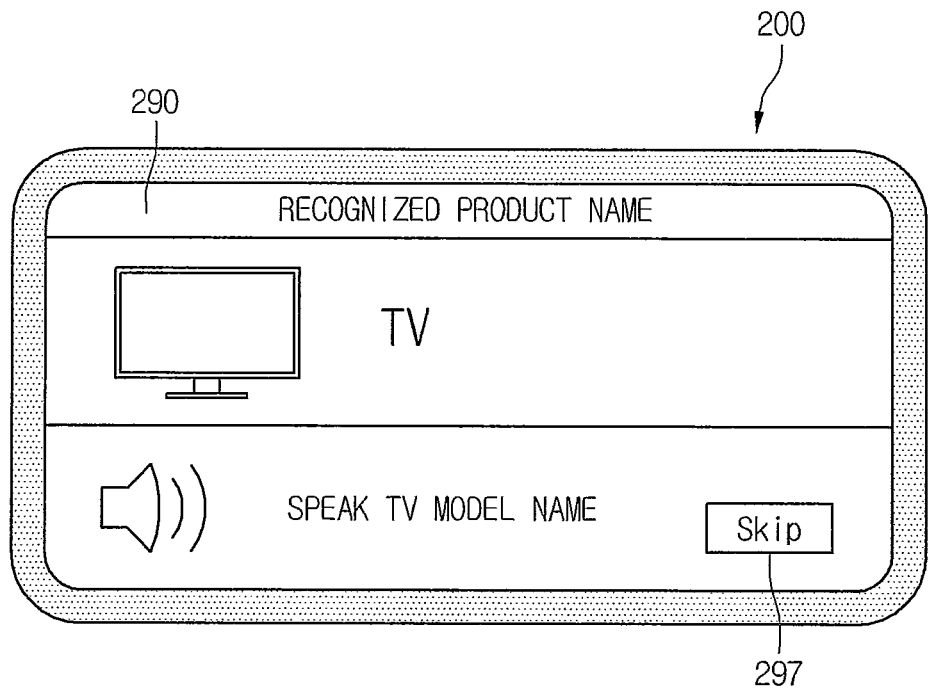

Referring to FIG. 19, the product name 'TV' of the corresponding electronic device identified by the captured image of the first electronic device 300 may be displayed on the screen 290 of the portable terminal 200.

With that, a guide message for inputting the model name of the first electronic device 300 with voice may be displayed on the screen 290, or may be outputted with voice through the sound outputting module 255.

The user confirms the model name of the first electronic device 300 and speaks the confirmed model name to the mike 237 according to the guide message. That is, the voice including the corresponding model name is inputted through the mike 237.

However, if both the product name and the model name of the corresponding electronic device are identified by using the captured image of the first electronic device 300, the guide message may not be outputted, and the above user voice input process may be omitted.

As mentioned above, since the product name of the corresponding electronic device is identified first by using the image of the electronic device 300 captured by the camera 236, it may be simpler than a process for identifying the model name of the corresponding electronic device through user voice, and accordingly, accuracy of identifying an electronic device may be improved.

Figure 20:
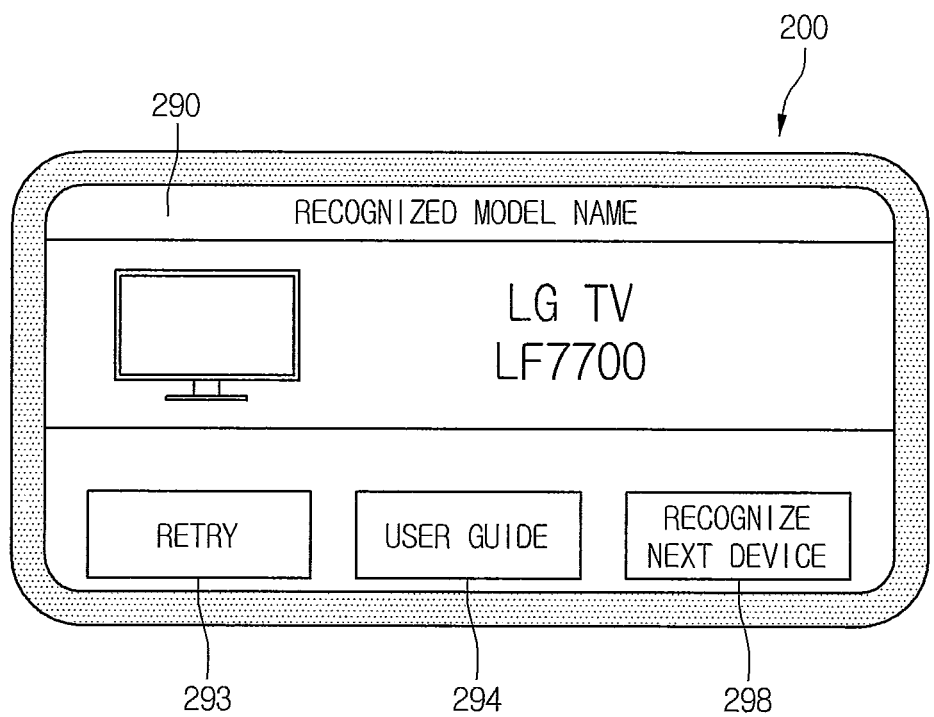

Referring to FIG. 20, the product name and the model name (for example, 'LG TV LF7700') of the electronic device identified by using the image of the electronic device 300 captured by the camera 236 and the user voice inputted through the mike 237 may be displayed on the screen 290.

If the user selects a button 'retry' 293, as described with reference to FIGS. 17 to 19, a process for identifying the first electronic device 300 may be performed several times.

Moreover, if the button 'user guide' 294 is selected, detailed description for identifying the product name and the model name of the first electronic device 300 may be provided to the user through the screen 290.

Additionally, if the user selects the button 'next device recognition' 298 is selected, processes for recognizing a device that is to be connected to the first electronic device 300 may be sequentially performed.

Figure 21:
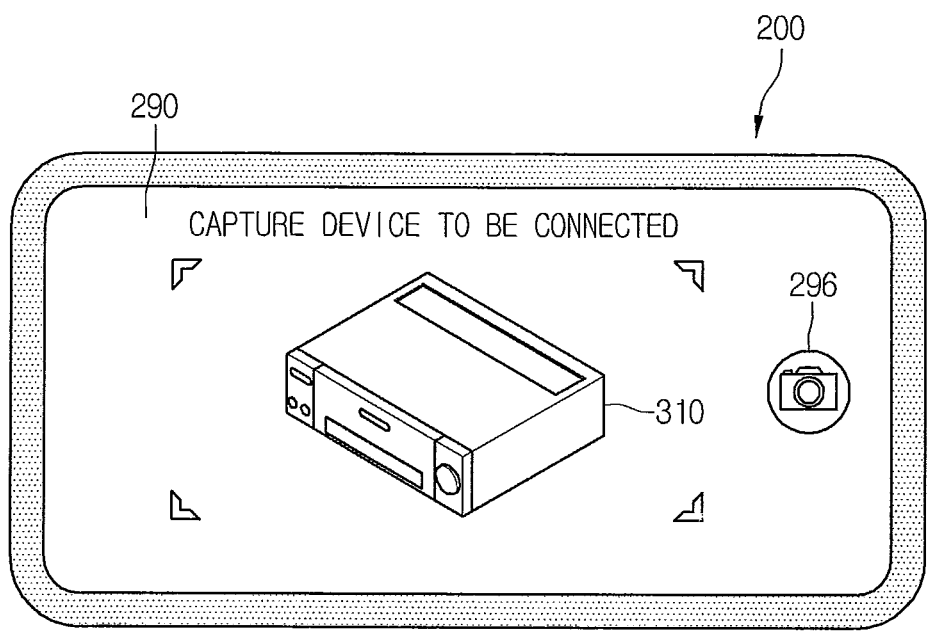

Referring to FIG. 21, the user may adjust a direction and position of the camera 236 to allow the second electronic device 310, which is to be connected to the first electronic device 300, to be positioned within the screen 290 of the portable terminal 200, and then, may select the capturing button 296 to capture the second electronic device 310.

Figure 22:
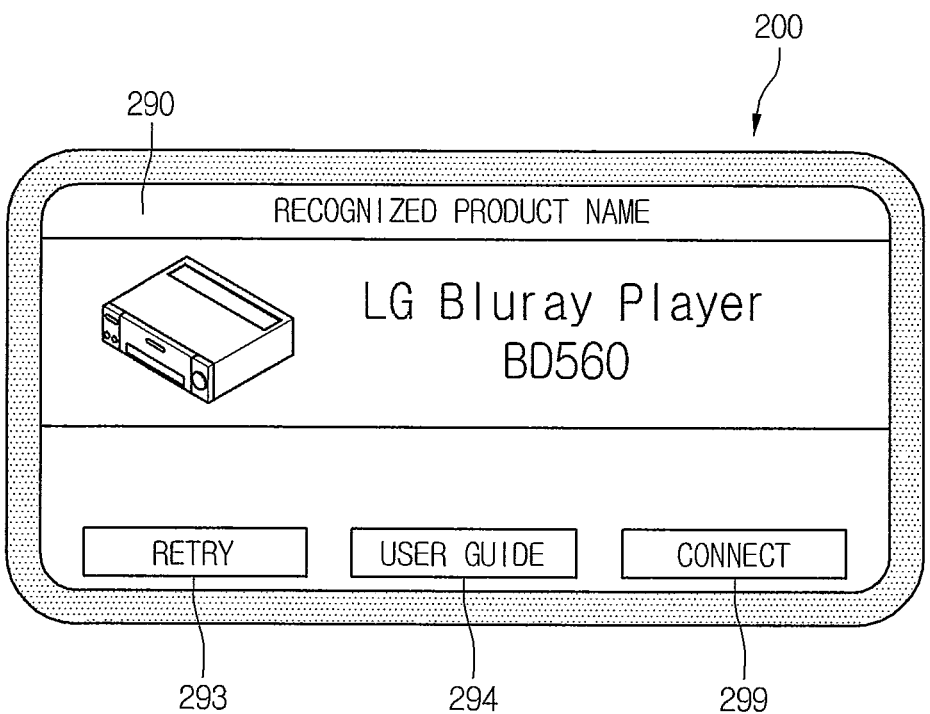

Referring to FIG. 22, the product name and the model name (for example, 'LG Bluray Player BD560') of the electronic device identified by using the image of the second electronic device 310 captured by the camera 236 may be displayed on the screen 290.

Furthermore, in order to identify the product name and the model name of the second electronic device 310, a user voice recognition process using the mike 237 described with reference to FIG. 19 may be additionally performed.

If the user selects a button 'retry' 293, as described with reference to FIGS. 21 to 22, a process for identifying the second electronic device 310 may be performed several times.

Moreover, if the button 'user guide' 294 is selected, detailed description for identifying the product name and the model name of the second electronic device 310 may be provided to the user through the screen 290.

Additionally, if the user selects the button 'connection' 299 is selected, as mentioned above, a connection operation between the identified first and second devices 300 and 310 may be performed.

Since a connection operation performed between the first and second electronic devices 300 and 310 and providing information on a connection result may be identical to those described with reference to FIGS. 12 to 15, its detailed description will be omitted.

Moreover, if connection between the first and second electronic devices 300 and 310 is successfully completed, the user interface for integrated control described with reference to FIG. 16 may be displayed on the screen 290.

Figure 23:
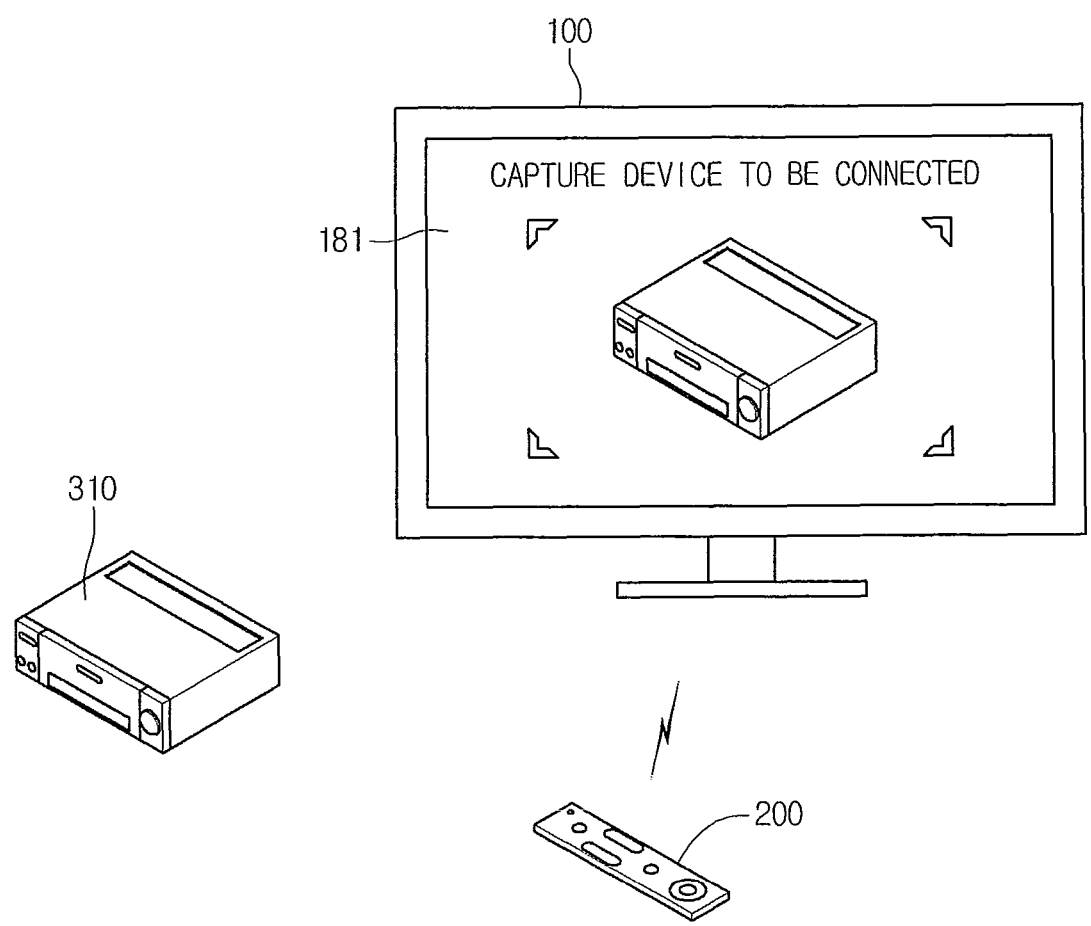
FIG. 23 is a view illustrating a method of controlling a connection between an image display device and an electronic device by using a portable terminal.

FIG. 23 is a view illustrating a method of controlling a connection between an image display device and an electronic device by using a portable terminal according to an embodiment.

Referring to FIG. 23, if the portable terminal 200 does not include a display module, an image of the electronic device 300 obtained using the camera 236 built in the portable terminal 200 may be displayed on the screen 181 of the image display device 100.

Moreover, the screen image shown in FIGS. 6 to 12 may be transmitted to the image display device 100 through the wireless communication unit 225 of the portable terminal 200, so that it may be displayed on the screen 181 of the image display device 100.

Additionally, the user may capture an image of the electronic device 300, which is to be connected to the image display device 100, by using the camera 236 of the portable terminal 200, so that it is controlled to connect the image display device 100 and the electric device 300 each other.

In this case, the portable terminal 200 may transmit the captured image of the electronic device 300 to the image display device 100, so that it is controlled to connect the image display device 100 with the electronic device 300.

For this, the image display device 100 identifies the electronic device 300 by using the image transmitted from the portable terminal 200, and then, may perform connection operations with the electronic device 300 by using the identification information on the electronic device 300.

Hereinafter, referring to FIGS. 24 to 32, a control method of connecting electronic devices through a portable terminal will be described in more detail according to another embodiment.

Figure 24:
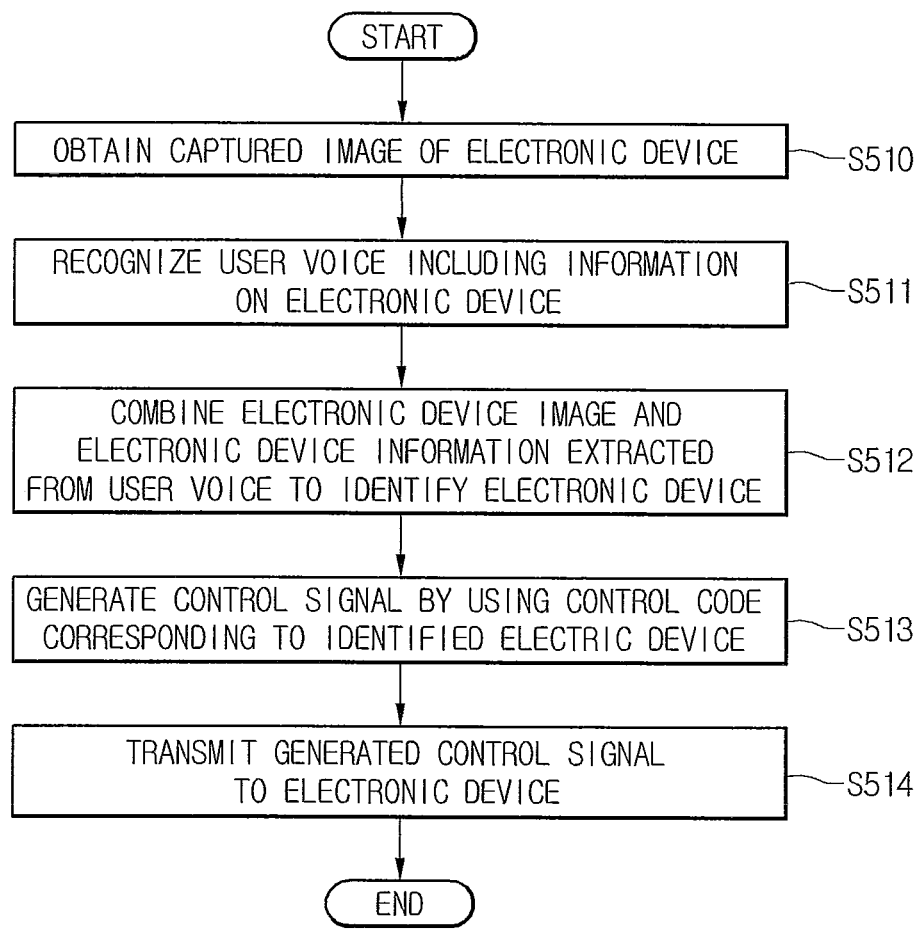
FIG. 24 is a flowchart illustrating a method of controlling an electronic device according to another embodiment.

FIG. 24 is a flowchart illustrating a control method of connecting electronic devices according to an embodiment. The shown control method is combined with the block diagram illustrating the configuration of the portable terminal 200 of FIG. 4 for description.

Referring to FIG. 24, the camera 236 of the portable terminal 200 obtains a captured image of an electronic device in operation S510, and the mike 237 recognizes and obtains a user voice including information on the electronic device in operation S511.

A user captures the electronic device 300 for control by using the camera 236 built in the portable terminal 200, and then may input toward the mike 237 the information on the electronic device 300 that the user wants with voice according to a guide of the portable terminal 200.

Then, the control unit 280 combines the image of the electronic device and the information on the electronic device extracted from the user voice to identify the electronic device in operation S512.

For example, the control unit 280 may identify identification information such as the product name or the model name of the electronic device 300 by using an image outputted from the camera 236. For this, a database for searching a product having a similar appearance to the electronic device 300 may be established in the storage unit 270, or a character recognition algorithm for recognizing the product name or the model name of the electronic device 300 through the image may be performed by the control unit 280.

Moreover, the electronic device identifying operation in operation S512 may not be directly performed in the control unit 280 of the portable terminal 200.

For example, after the image of the electronic device 300 obtained through the camera 236 of the portable terminal 200 may be transmitted to the Internet server 400, the internet server 400 may search the database or perform a character recognition algorithm by using the transmitted image so that it may identify the product name or the model name of the electronic device 300. Then, the internet server 400 may transmit the identification information on the electronic device 300 to the portable terminal 200.

Moreover, transmitting/receiving the image and identification information between the portable terminal 200 and the internet server 400 may be performed through the internet-enabled image display device 100.

Additionally, if the information on the electronic device 300 recognized by using the image obtained by the camera 236 is sufficient for identifying the corresponding electronic device through the above method (for example, the control unit 280 confirms the model name of the electronic device 300), the user voice recognition process in operation S511 may be omitted.

Additionally, if the information on the electronic device 300 recognized by using the image obtained by the camera 236 is insufficient for identifying the corresponding electronic device through the above method (for example, the control unit 280 cannot confirm the model name of the electronic device 300), the control unit 280 combines the information on the electronic device 300 recognized by using the image obtained by the camera 236 and the information on the electronic device 300 extracted from the user voice recognized through the mike 237 to identify the electronic device 300.

For example, after the product name of the electronic device 300 is identified by using the image obtained by the camera 236, the control unit 280 may select one of the model names relating to the corresponding product by using the electronic device information recognized from the user voice.

Then, the control unit 280 generates a control signal by using a control code corresponding to the identified electronic device in operation S513, and the wireless communication unit 225 transmits the generated control signal to the electronic device in operation S514.

For example, if the control codes for controlling the electronic device 300 identified in operation S513 are stored in the storage unit 270, the control unit 280 may generate a control signal corresponding to a user request by using the stored control codes.

Moreover, if the control codes for controlling the electronic device 300 are not stored in the storage unit 270, after a control program including the control codes is downloaded from an external, and then, installed in the portable terminal 200, the control unit 280 may generate a control signal corresponding to a user request by using the installed control program.

FIGS. 25 to 31 are views illustrating a method of controlling connection between electronic devices by using a portable terminal according to embodiments.

Figure 25:
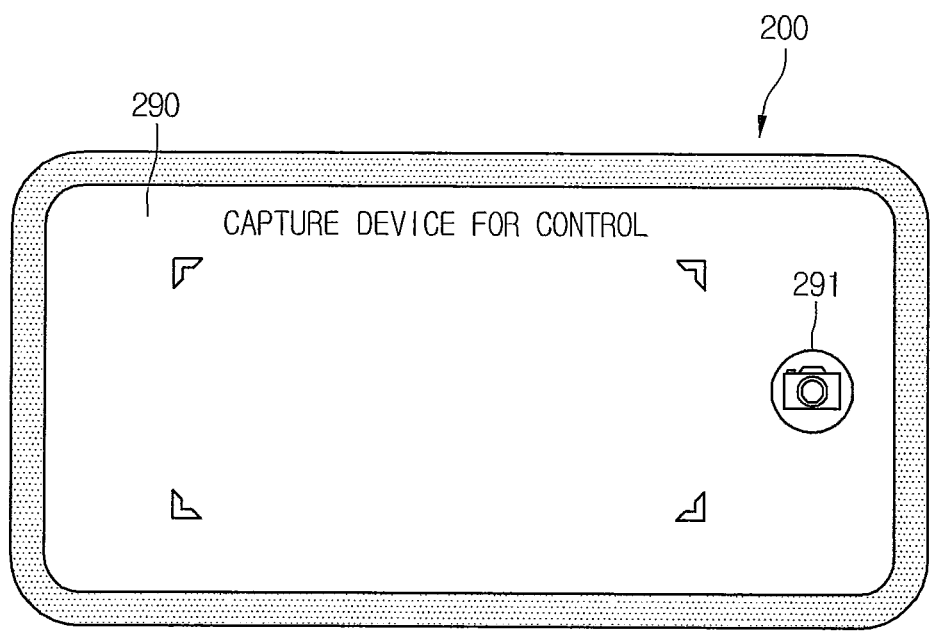
FIGS. 25 to 31 are views illustrating a method of controlling an electronic device by using a portable terminal according to embodiments.

Referring to FIG. 25, when a user executes a control function for electronic devices in the portable terminal 200, power may be supplied to the camera 236 built in the portable terminal 200, and then, a capturing function may be activated.

Figure 26:
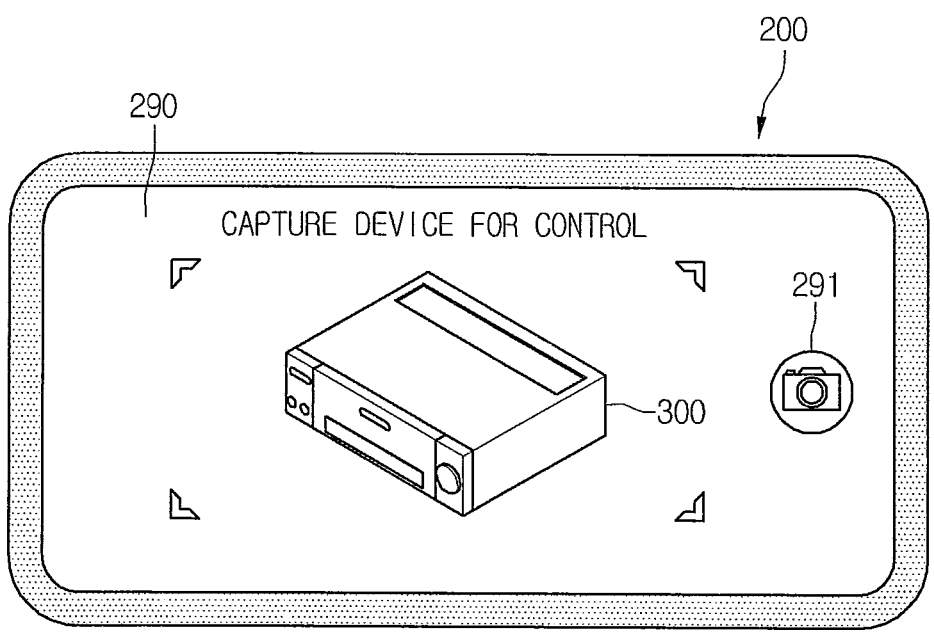

Then, as shown in FIG. 26, the user may adjust a direction and position of the camera 236 to allow the electronic device 300 that the user wants to control to be positioned within the screen 290 of the portable terminal 200, and then, may select the capturing button 291 to capture the electronic device 300.

Figure 27:
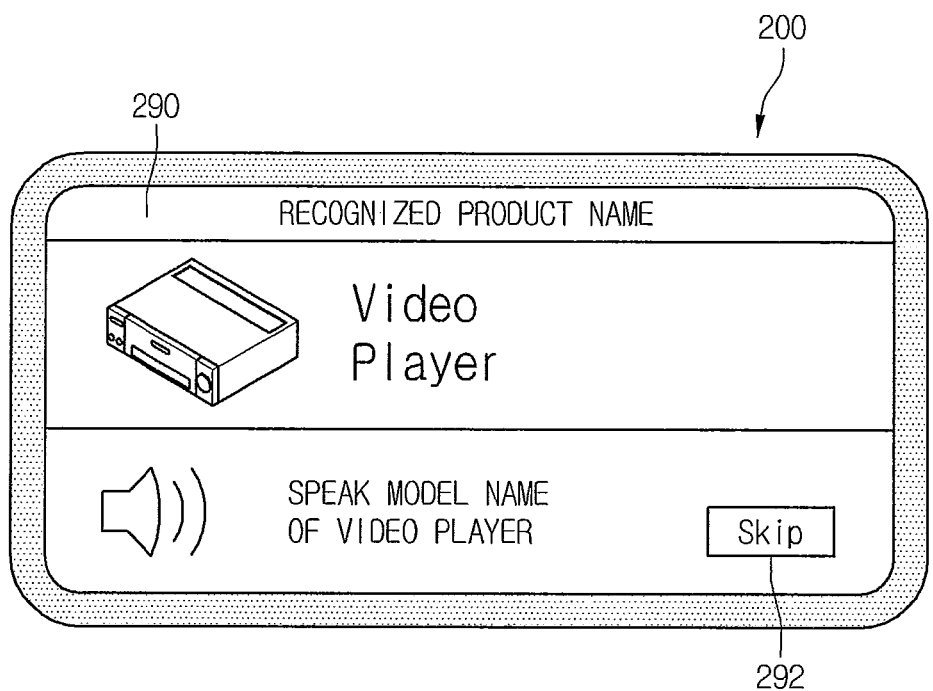

Referring to FIG. 27, the product name (for example, a video player) of the corresponding electronic device identified by the captured image of the first electronic device 300 may be displayed on the screen 290 of the portable terminal 200.

With that, a guide message for inputting the model name of the electronic device 300 with voice may be displayed on the screen 290, or may be outputted with voice through the sound outputting module 255.

The user confirms the model name of the electronic device 300 and speaks the confirmed model name to the mike 237 according to the guide message. That is, the voice including the corresponding model name is inputted through the mike 237.

However, if both the product name and the model name of the corresponding electronic device are identified by using the captured image of the electronic device 300, the guide message may not be outputted, and the above user voice input process may be omitted.

Additionally, if the model name of the electronic 300 cannot be confirmed, the user selects the button 'skip' 292 so that the above user voice input process may be omitted.

As mentioned above, since the product name of the corresponding electronic device is identified first by using the image of the electronic device 300 captured by the camera 236, it may be simpler than a process for identifying the model name of the corresponding electronic device through user voice, and accordingly, accuracy of identifying an electronic device may be improved.

Figure 28:
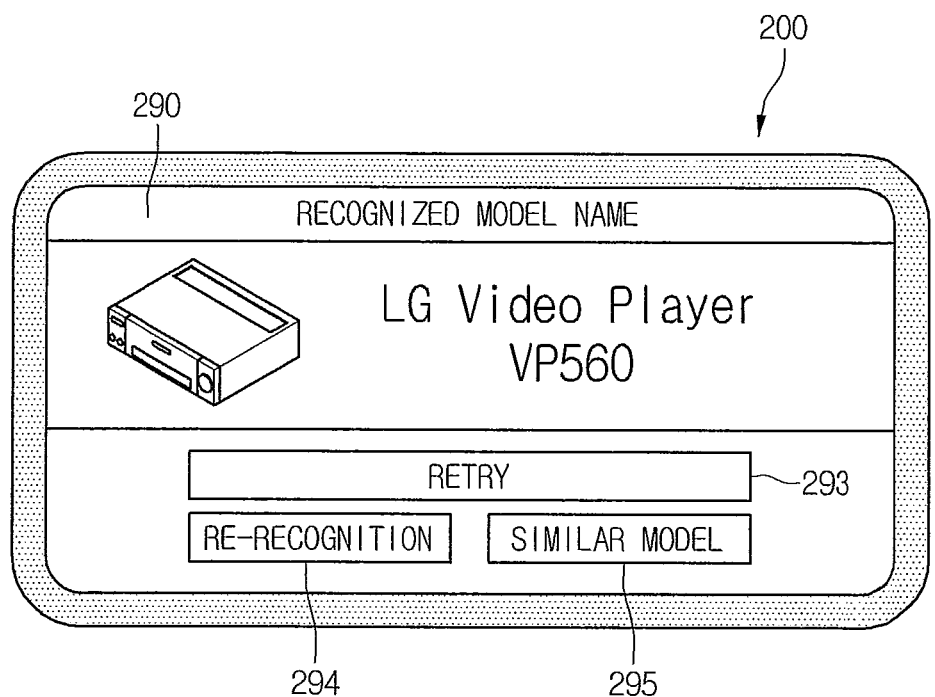

Referring to FIG. 28, the product name and the model name (for example, 'LG Video Player VP560') of the electronic device identified by the image of the electronic device 300 captured by the camera 236 and the user voice inputted through the mike 237 may be displayed on the screen 290.

If the user selects the button 'confirm' 293 on the screen 290, the portable terminal 200 changes into a state in which it controls the electronic device 300 having the model name 'LG Video Player VP560'

If the user selects the button 're-recognition' 294, as described with reference to FIGS. 25 to 27, a process for identifying the electronic device 300 may be performed several times.

Figure 29:
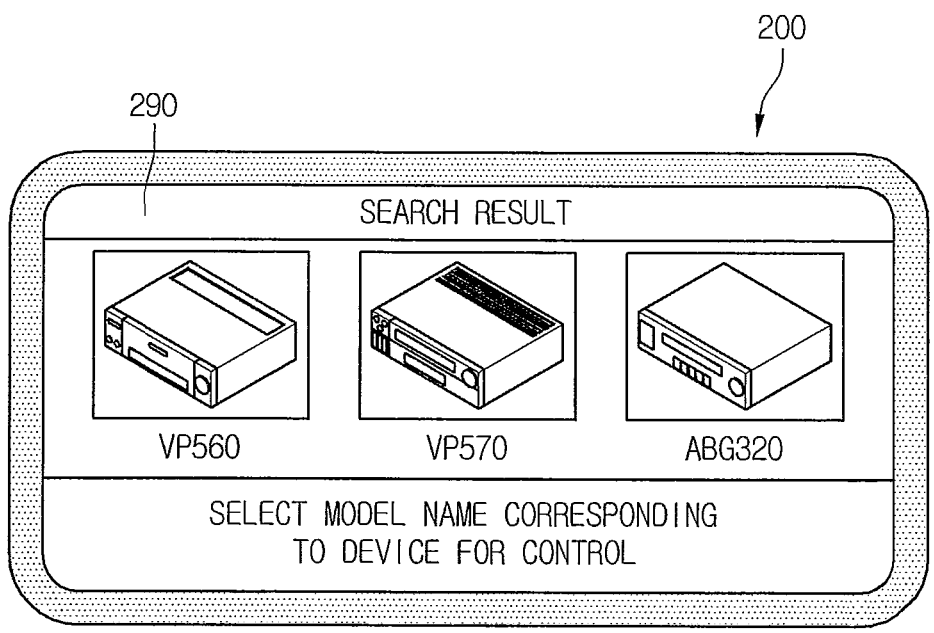

Moreover, if the user selects the button 'Skip' 292 on the screen 290 of FIG. 27, as shown in FIG. 29, information on a plurality of models belonging to the product name identified by using the captured image of the electronic device 300 may be displayed on the screen 290, and then, the user may select one of the model names displayed on the screen 290.

Furthermore, if the user selects the button 'similar model' 295 on the screen 290 of FIG. 28, the screen 290 of the portable terminal 200 may change as shown in FIG. 29.

Figure 30:
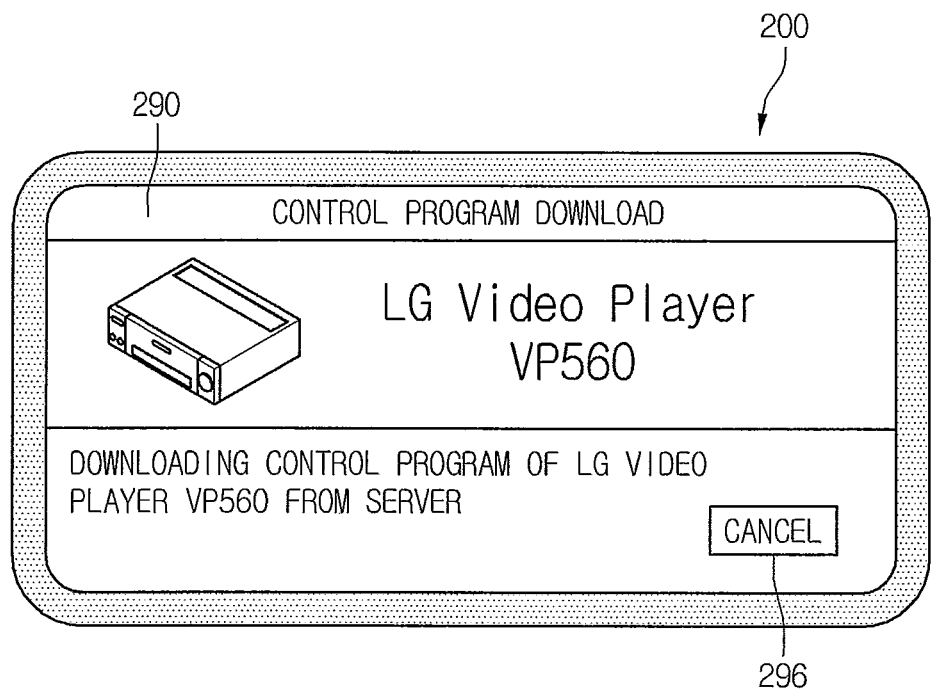

Referring to FIG. 30, if a control program for controlling an electronic device having the identified product name and model name is not installed in the portable terminal 200, the portable terminal 200 may download the control program corresponding to the electronic device 300 from the internet server 400.

In this case, the portable terminal 200 may transmit/receive data to/from the internet sever 400 through the internet-enabled image display device 100, and the user may select the button 'cancel' 296 on the screen 290 to cancel the download of the control program.

Figure 31:
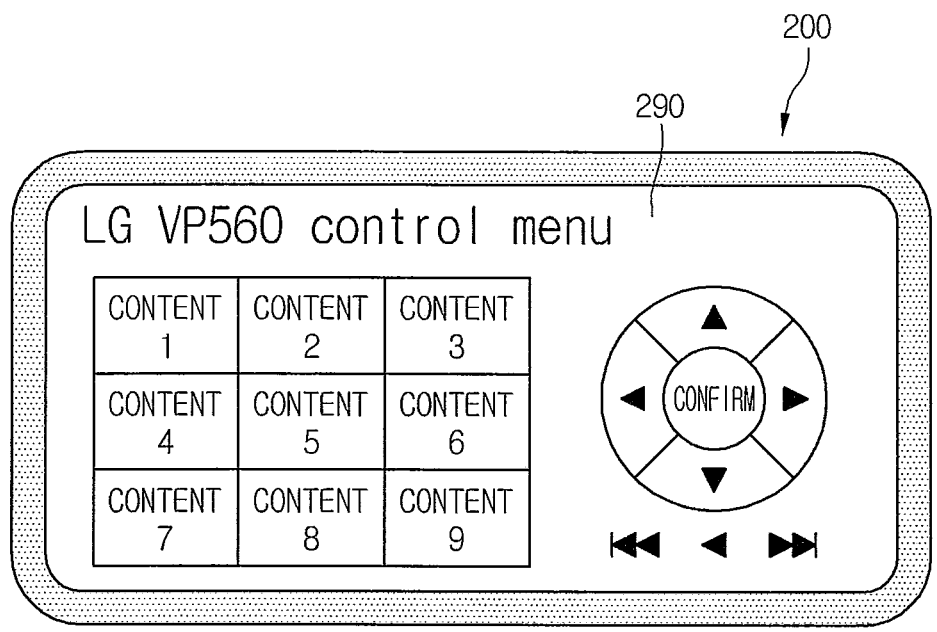

Referring to FIG. 31, after the product name and the model name of the electronic device 300 that is to be controlled are identified, and the download and installation of the control program for a corresponding electronic device are completed, a user interface for controlling the electronic device 300 in the shape of a screen remote controller may be displayed on the screen 290 of the portable terminal 200.

The user may request a desired function for the electronic device 300 by using the user interface displayed on the screen 290, and the control unit 280 of the portable terminal 200 may generate a control signal corresponding to the user request in order to transmit it to the electronic device 300 through the wireless communication unit 225.

Figure 32:
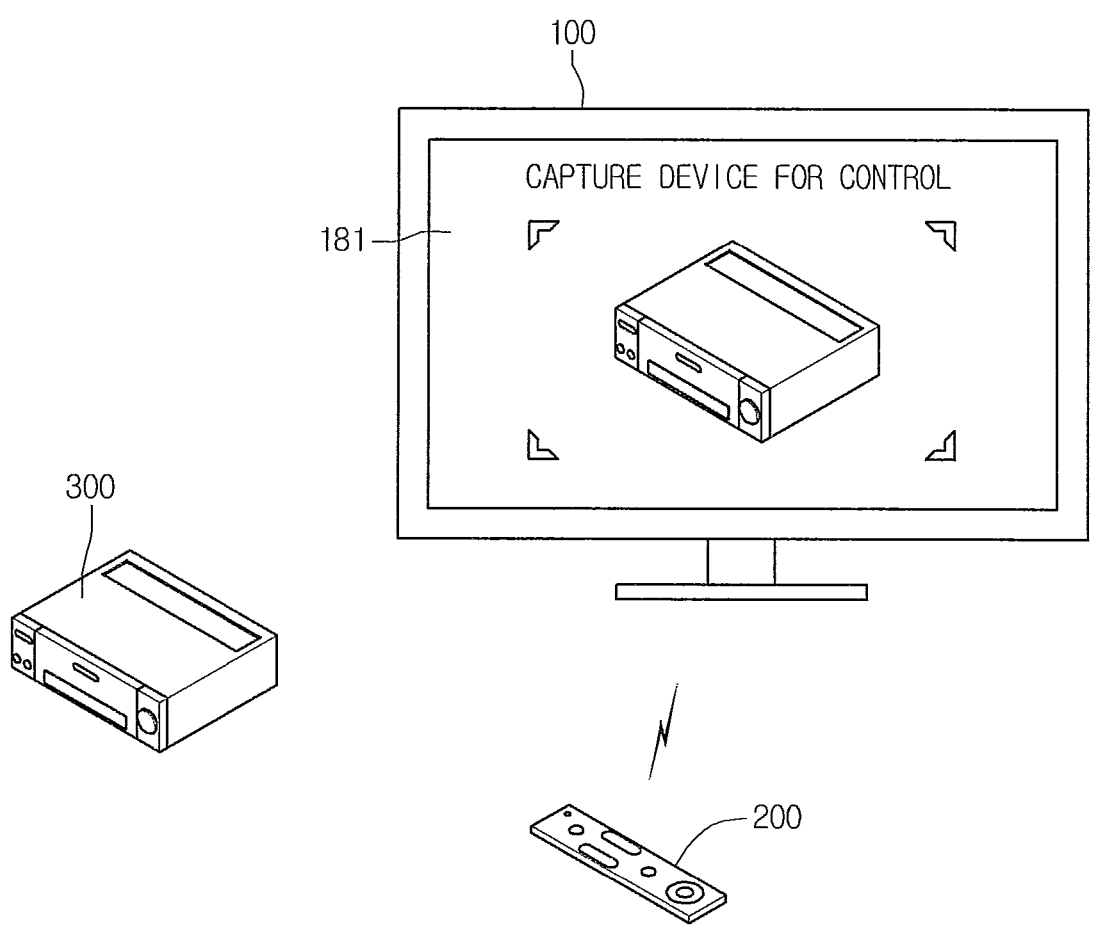
FIG. 32 is a view illustrating a method of controlling an electronic device by using a portable terminal according to another embodiment.

FIG. 32 is a view illustrating a method of controlling an electronic device by using a portable terminal according to another embodiment.

Referring to FIG. 32, if the portable terminal 200 does not include a display module, an image of the electronic device 300 obtained using the camera 236 built in the portable terminal 200 may be displayed on the screen 181 of the image display device 100.

Moreover, the screen image shown in FIGS. 25 to 31 may be transmitted to the image display device 100 through the wireless communication unit 225 of the portable terminal 200, so that it may be displayed on the screen 181 of the image display device 100.

According to an embodiment, by identifying electronic devices that are to be connected to each other with an image of an electronic device captured by a camera, connection target devices may be more accurately recognized and may be controlled without errors, and also user's convenience may be improved by controlling various electronic devices with one control device.

According to another embodiment, by identifying electronic devices that are to be connected to each other with an image of an electronic device captured by a camera and the electronic device information extracted from a user voice, connection target devices may be more accurately recognized and may be controlled without errors, and also user's convenience may be improved by controlling various electronic devices with one control device.

The method of controlling an electronic device according to the present invention may be programmed to be executed in a computer and may be stored on a computer readable recording medium. Examples of the computer readable recording medium include read-only memory (ROM), random-access memory (RAM), CD-ROMs, magnetic tapes, floppy disks, and optical data storage devices The computer readable recording medium can also be distributed over network coupled computer systems so that the computer readable code is stored and executed in a distributed fashion. (Also, functional programs, codes, and code segments for accomplishing the present invention can be easily construed by programmers skilled in the art to which the present invention pertains.

Moreover, although the preferred embodiments of the present invention are described above, the present invention is not limited the above-mentioned specific embodiments. It will be understood by those skilled in the art that various changes in forms and details may be made therein without departing from the spirit and scope of the invention. Also, these modified embodiments should be understood without departing from the technical scope or prospect of the present invention.

What is claimed is:

1. A method of controlling a connection between electronic devices by using a portable terminal, the method comprising:
    obtaining an image of a first electronic device captured by using a camera built in the portable terminal;
    identifying the first electronic device on the basis of the image captured by the camera; and
    transmitting at least one of the captured image of the first electronic device and identification information on the first electronic device to a second electronic device that is to be connected to the first electronic device;
    receiving information on a connection result between the first and second electronic devices from the first electronic device or the second electronic device; and
    outputting the received connection result information.

2. The method according to claim 1, further comprising performing a connection operation with the first electronic device through the second electronic device by using the transmitted identification information.

3. The method according to claim 1, wherein the obtaining of the image comprises obtaining a captured image of a plurality of electronic devices including the first and second electronic devices.

4. The method according to claim 3, further comprising selecting each of the first and second electronic devices through a user by using the obtained image.

5. The method according to claim 3, further comprising displaying the obtained image and identification information on the plurality of electronic devices on a screen.

6. The method according to claim 1, wherein the obtaining of the image comprises:
    obtaining a captured first image of the first electronic device; and
    obtaining a captured second image of the second electronic device.

7. The method according to claim 6, further comprising:
    displaying the obtained first image and the identification information on the first electronic device on a screen; and
    displaying the obtained second image and identification information on the second electronic device on the screen.

8. The method according to claim 1, wherein, if a connection between the first and second electronic devices has failed, the displayed connection result information comprises at least one of a reason and a solution for the connection fail.

9. The method according to claim 1, further comprising displaying on a screen a user interface for integrated control on operations of the first and second electronic devices.

10. The method according to claim 1, wherein the second electronic device is an image display device controlled by the portable terminal.

11. The method according to claim 10, wherein the transmitting of the at least one image comprises transmitting a connection request message including the identification information on the first electronic device to the image display device.

12. A portable terminal for controlling a connection between electronic devices, the portable terminal comprising:
    a camera for obtaining a captured image of a first electronic device;
    a control unit for obtaining identification information on the first electronic device on the basis of the obtained image;
    a transmission unit for transmitting at least one of the captured image of the first electronic device and the identification information on the first electronic device to a second electronic device that is to be connected to the first electronic device,
    wherein the control unit is configured to receive information on a connection result between the first and second electronic devices from the first electronic device or the second electronic device; and
    output the received connection result information.

13. The portable terminal according to claim 12, wherein the second electronic device performs a connection operation with the first electronic device in response to the transmitted connection request message.

14. The portable terminal according to claim 12, wherein the camera obtains a captured image of a plurality of electronic devices including the first and second electronic devices.

15. The portable terminal according to claim 14, further comprising a user interface unit for selecting each of the first and second electronic devices through a user by using the obtained image.

16. The portable terminal according to claim 12, wherein the camera sequentially obtains a captured first image of the first electronic device and a captured second image of the second electronic device.

17. The portable terminal according to claim 12, further comprising a display unit for displaying on a screen a user interface for integrated control on operations of the first and second electronic devices.

18. The portable terminal according to claim 12, wherein the second electronic device is an image display device controlled by the portable terminal.

19. A non-transitory computer readable recording medium storing a program for executing a method in claim 1.

* * * * *